United States Patent
Willars

(10) Patent No.: US 8,300,575 B2
(45) Date of Patent: Oct. 30, 2012

(54) PRIORITY BEARERS IN A MOBILE TELECOMMUNICATION NETWORK

(75) Inventor: Per Willars, Vaxholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1183 days.

(21) Appl. No.: 11/722,426

(22) PCT Filed: Dec. 29, 2004

(86) PCT No.: PCT/SE2004/002044
§ 371 (c)(1),
(2), (4) Date: Jun. 21, 2007

(87) PCT Pub. No.: WO2006/071155
PCT Pub. Date: Jul. 6, 2006

(65) Prior Publication Data
US 2008/0020775 A1 Jan. 24, 2008

(51) Int. Cl.
*H04W 4/00* (2009.01)
(52) U.S. Cl. ......... 370/328; 455/450; 455/453; 455/512
(58) Field of Classification Search ................. 455/450, 455/453, 512; 370/328
See application file for complete search history.

(56) References Cited

U.S. PATENT DOCUMENTS

| 7,089,017 B2* | 8/2006 | Chen et al. | 455/453 |
| 7,773,708 B2* | 8/2010 | Parantainen | 375/354 |
| 2005/0053070 A1* | 3/2005 | Jouppi | 370/395.3 |
| 2006/0083168 A1* | 4/2006 | Prakash | 370/230 |

FOREIGN PATENT DOCUMENTS

| WO | WO 02/19619 | * | 3/2002 |
| WO | WO 0219619 A2 | | 3/2002 |

* cited by examiner

*Primary Examiner* — Amancio Gonzalez
(74) *Attorney, Agent, or Firm* — Roger S. Burleigh

(57) ABSTRACT

Method for switching a packet to a bearer in a mobile telecommunication network, by setting up multiple parallel bearers for bearing the packet across a radio interface; associating the bearers with a bearer priority level of traffic handling; determining a priority level of the packet; mapping the packet priority level to the bearer priority level; switching the packet to one of the bearers based on the mapping; using the bearer priority level to prioritize the access to the radio resources. A further method for switching a packet by setting up multiple parallel bearers without resource reservation; associating each of the bearers with a bearer priority level; mapping a flow of packets to one of the bearer priority levels, when a service is started; switching each packet to one of the multiple bearers based on the mapping; using the bearer priority level to prioritize the access to the radio resources.

46 Claims, 13 Drawing Sheets

PRIORITY BEARERS IN A MOBILE TELECOMMUNICATION NETWORK

BACKGROUND OF THE INVENTION

1. Technical Field of the Invention

The present invention relates to mobile telecommunication networks supporting packet flows.

2. Description of Related Art

Currently there are different kinds of mobile telecommunication networks (or briefly referred to as "wireless network") that offer pack packet-switched access.

One example of such a wireless network is the 3G mobile network according to 3GPP specifications. Such a network is composed by a number of different subnetworks: a Radio Access Network (RAN), based on different radio access technologies, a Packet-Switched (PS) Core Network (CN), and a Service Network implementing services and service enablers. Also included in such a system are mobile terminals (wireless telephones and data communication devices, also called user equipment—UE). FIG. 1 shows the overall network architecture of such a network.

A first example of such a RAN is Wideband Code-Division Multiple Access (WCDMA) RAN. WCDMA is a third generation mobile communication system that uses WCDMA technology. WCDMA provides for high-speed data and voice communication services. Installing or upgrading to WCDMA technology allows mobile service providers to offer their customers wireless broadband (high-speed Internet) services and to operate their systems more efficiently (more customers per cell site radio tower). The WCDMA RAN is composed of radio Base Stations (also called Node B), Radio Network Control (RNC) nodes and an interconnection system between these nodes (switches and data routers). A second example of a Radio Access Network that offers packet-switched access is the GSM RAN, also called General Packet Radio Service (GPRS), which is a packet data communication system that uses the Global System for Mobile (GSM) radio system packet radio transmission. The GSM RAN modifies the GSM channel allocation and time slot control processes to allow for the dynamic assignment of time slots to individual users. The nodes in a GSM RAN are the Base Transceiver Station (BTS, also called base station) and the Base Station Controller (BSC).

The Packet-Switched Core Network, also referred to as the GPRS CN, includes the following nodes:

Gateway GPRS Support Node (GGSN), which is a packet switching system that is used to connect a GSM mobile communication network (GPRS Support Nodes) to other packet networks such as the Internet; and Serving GPRS Support Node (SGSN), which is a switching node in the wireless network that coordinates the operation of packet radios that are operating within its service coverage range. The SGSN operates in a similar process of a MSC and a VLR, except the SGSN performs packet switching instead of circuit switching. The SGSN registers and maintains a list of active packet data radios in its network and coordinates the packet transfer between the mobile radios.

In a wireless network that offers packet-switched access, the operator provides not only the access, but may also provide services on top of this access. Examples of these services are premium video clips and multimedia services. The mechanisms for offering such services, as well as subscriber related functions for controlling access to the basic PS bearer services, are included in the Service Network. The Service Network may include many nodes, for instance the HLR (Home Location Register), application servers, proxy servers, policy decision functions, flow inspection functions, Border Gateways (BGW) for interconnecting to other networks and more.

In the cases where the operator provides and charges for an end-user service rather than the basic PS access, it is important for the operator to be able to control the quality of the service delivery.

The quality of the service delivery is highly dependent on the Bearer service. Bearer services are services that are used to transfer user data and control signals between two pieces of equipment. Bearer services can range from the transfer of low speed messages (300 bits per second) to very high-speed data signals (10+ Gigabits per second). Bearer services are typically categorized by their information transfer characteristics, methods of accessing the service, inter-working requirements (to other networks) and other general attributes. Information transfer characteristics include data transfer rate, delay requirements, direction(s) of data flow, type of data transfer (circuit or packet) and other physical characteristics. The access methods determine what parts of the system control may be affected by the bearer service. Some bearer services must cross different types of networks (e.g. wireless and wired) and the data and control information may need to be adjusted depending on the type of network.

The main service offered by a 3G mobile Packet-Switched network is connectivity to an IP network from the terminal to the GGSN node, via a bearer referred to as the PDP context. Its characteristics are different depending on what kind of service/information is to be transported. In case of WCDMA Radio Access Network (RAN), the PDP context in turn uses a Radio Access Bearer (RAB) service, with matching characteristics. The RAB in turn consists of a Radio Bearer between the terminal and the Radio Network Controller (RNC), and an Iu bearer between the RNC and the core network.

The PDP context/RAB carries user data between the mobile terminal and the GGSN, which is acting as the access router to the IP network, e.g. Internet.

The PDP context/RAB is characterized by certain Quality of Service (QoS) parameters, such as bit rate and delay, service availability, maximum Bit Error Rate (BER), Guaranteed Bit Rate (GBR) and other measurements to ensure quality communications service. The terminal will request a PDP context from the Core Network, matching the needs of the application initiated by the user. The core network will select a RAB with appropriate QoS based on the PDP context request from the mobile terminal, and ask the RNC to provide such a RAB.

The QoS model of the wireless (cellular) network is currently discussed in the Third Generation Partnership Project (3GPP), which is a collaboration agreement that brings together a number of telecommunications standards bodies. 3GPP has defined four different quality classes of PDP context/Radio Access Bearers, with their characteristics:

Conversational (used for e.g. voice telephony), providing low delay and guaranteed bitrate;

Streaming (used for e.g. watching a video clip), providing moderate delay and guaranteed bitrate;

Interactive (used for e.g. web surfing), providing moderate load-dependent delay without guarantees on throughput/bitrate; and Background (used for e.g. file transfer), which is the same as Interactive but with a lower priority.

Both the Conversational and Streaming PDP contexts/RABs require a certain reservation of resources in the network, and are primarily meant for real-time services. They differ mainly in that the Streaming PDP contexts/RAB tolerates a higher delay, appropriate for one-way real-time services. The Interactive and Background PDP contexts/RABs are so called "best effort", i.e. no resources are reserved and the throughput depends on the load in the cell. The only difference is that the Interactive PDP context/RAB provides a priority mechanism.

The QoS of the Cellular Network discussion in 3GPP is connection-oriented. It is based on establishing bearers with certain QoS classes. For the QoS class Interactive (and Background), the system does not reserve radio resources for the full lifetime of the connection (bearer). Resources need only be allocated when packets need to be transmitted. Therefore, no admission control is needed in relation to the setting up of the bearer.

QoS classes "Streaming" and "Conversational" provide a guaranteed bitrate, i.e. the system reserves bandwidth at the set up of the bearer. This implies the use of an admission control mechanism at bearer set up, whereby the system rejects a new bearer if it cannot guarantee the bitrate of the new bearer and the already admitted ones. A server system will deliver a datastream of e.g. audio to a client. The client receives the data stream and (after a short buffering delay) decodes the data and plays it to a user. Each bearer is identified as a Packet Data Protocol (PDP) context between the terminal and the Core Network, and as a Radio access bearer through the Radio Access Network (one-to-one mappings).

It is widely assumed that applications requiring strict QoS in terms of throughput and/or delay characteristics need to be mapped to a streaming/conversational bearer with guaranteed bit rate.

A user priority level may be assigned to users or devices within a communication network and is used to coordinate access privileges based on network activity or other factors. Priority handling can be achieved with an Interactive bearer, which is associated with a Traffic Handling Priority. In the state of the art, the subscription level, such as "Gold", "Silver" or "Bronze", is normally used to determine the priority level of a single Interactive bearer for the user.

If it is desired to use an Interactive bearer with a certain priority level for a specific service/application, the current art solution is that the terminal requests this bearer at service start time, and associates it with the flow of the particular service.

Within the radio access network, there are possibilities for providing priority scheduling between flows of different users, e.g. by intelligent channel assignments (packet services mapped to DCH) or priority scheduling in the base station (HSDPA).

At the cellular radio interface, there is a fundamental distinction between two cases of resource assignment:

Dedicated resource assignment. A radio resource (characterised e.g. by frequency, code, power) is assigned from the network to a terminal connection until explicitly released by the network.

Shared resource assignment. A radio resource is shared between many terminal connections, and is in a specific (short) time period temporarily assigned to a specific terminal connection. In the downlink direction, the network can typically make scheduling decisions based on availability of packets in buffers. In the uplink direction, there is a need for a protocol to resolve the situation when multiple terminals contend for the channel. Still, the final decision is in the network.

In a WCDMA RAN system, there are different channel types. For dedicated resource assignment, there is one channel type being DCH (Dedicated Channel): used in both link directions. The channel can be configured with different rates (e.g. 64, 128, 384 kbps). Once configured for a certain rate, resources for that rate are reserved (even if not used), until the channel is released or reconfigured.

There also exist a number of channel types using shared resource assignment, as follows:

Forward Access Channel (FACH): Downlink direction. Typically low bit rate. Scheduling done by the RNC.

Random Access Channel (RACH): Uplink direction. Typically used only to transfer minor packets, such as signalling.

Downlink Shared Channel (DSCH): Downlink. Specified, but not used in networks. Scheduling done by the RNC.

High Speed Downlink Shared Channel (HS-DSCH), also referred to as High-Speed Downlink Packet Access (HSDPA): Downlink direction. Scheduling done by the Node B (base station). Very high bit rates supported. Also mechanisms to handle flows of different priority levels. Added to specifications in 3GPP release 5.

Enhanced Dedicated Channel (E-DCH), also referred to as Enhanced Uplink: Uplink channel being specified by 3GPP for release 6. Although using a dedicated code-channel, the network has control of the power/interference resource. This is done by the Node B (base station), which can limit the rates of different terminals, as well as schedule which terminals that are allowed to transmit at all.

Important to note is that WCDMA includes the possibility for packet-switched bearers to switch between using the different channel types. For instance, a terminal with a packet-switched bearer ("Interactive" class) may use RACH/FACH when no data is being transmitted. When data arrives, the connection is switched to a DCH with a certain rate. If capacity exists, and the amount of data is high, the rate of the DCH may be switched up. For GSM RAN, the packet-switched services always use a PDPCH, which uses shared resource assignment. The scheduling is controlled by the BSC. Different priority levels can be used in the scheduling decisions.

A mechanism for providing Connectionless packet-by-packet priority handling on the Internet is for example provided by IETF (Internet Engineering Task Force) by means of Differentiated Services (Diffserv). Diffserv is a protocol that identifies different types of data with data transmission requirement flags (e.g. priority) so that the routing network has the capability to treat the transmission of different types of data (such as real-time voice data) differently. The goal of the evolving IETF Diffserv framework is to provide a means of offering a spectrum of services in the Internet without the need for per-flow state and signalling in every router. By aggregating a multitude of QoS-enabled flows into a small number of aggregates that are given a small number of differentiated treatments within the network, Diffserv eliminates the need to recognize and store information about each individual flow in core routers. This basic trick to scalability succeeds by combining a small number of simple packet treatments with a larger number of per-flow policing policies to provide a broad and flexible range of services. Each Diffserv flow is policed and marked at the first trusted downstream router according to a contracted service profile. When viewed from the perspective of a network administrator, the first trusted downstream router is a "leaf router" at the periphery of the trusted network. Downstream from the nearest leaf router, a Diffserv flow is mingled with similar Diffserv traffic into an aggregate. All subsequent forwarding and policing is performed on aggregates.

FIG. 2 shows an example of the mapping of application flows on bearers and down to channel types is done in a state of the art solution for WCDMA. Mapping from application to bearer type is done by the terminal, while mapping from bearer type to radio channel type is done by the RAN. Typically, any application with specific QoS requirements, such as Voice-over-IP (VoIP), streaming or other multimedia services, are mapped to a Conversational or Streaming bearer, with service specific attributes, including a guaranteed bit rate. The lower layer parameters for each such service-specific bearer needs also to be defined for interoperability reasons. The generic Interactive bearer is only used for web and other traffic with no strict QoS requirements.

The above-described current solutions have disadvantages, when using guaranteed bit rate bearers (streaming/conversational) to achieve a certain quality.

Firstly, these current methods and systems are too complex. For example because:
- there is a need to perform signalling to set up a service-specific bearer at the start of the application session or flow;
- each service needs to define a specific bearer with specific QoS parameters. All these bearers need to be implemented and tested for interoperability in different parts of the system. This increases the time to market for new applications.
- a connectionless flow of priority marked packets, such as Diffserv IP packets, does not fit with the connection oriented bearer concept of the 3GPP QoS. There needs to be a signalling event to establish the priority Interactive bearer. It is unsuitable to establish and release such a bearer for every packet that arrives, according to the priority of each individual packet.

Secondly the current methods and systems are not flexible enough. For example because an operator, charging not for the access but for a certain premium services, wants to fully control the QoS used for this service delivery, and not rely on the terminals mapping from service to bearer.

Thirdly, because in the current methods and systems there is a need to perform signalling at the start of the flow, a delay is encountered.

DISCLOSURE OF THE INVENTION

It is an object of the present invention to provide means to for switching a packet to a bearer in a mobile telecommunication network for achieving predictable Quality of Service for an operator-provided service.

The present invention provides, within the radio access network, for priority scheduling between flows of different users, e.g. by intelligent channel assignments (packet services mapped to a dedicated channel (DCH) or priority scheduling in the base station of High Speed Downlink Packet Access (HSDPA).

These and other objects are achieved while the present invention provides for
- using Interactive-class (best effort) bearers with priority scheduling mechanisms to ensure QoS instead of guaranteeing resources per flow;
- marking different types of data packets (hereinafter called "Packets") with a priority flag, so that the routing (switching) network has the capability to treat the transmission of different types of data;
- a connectionless flow of priority marked data packets to trigger correct priority handling instead of performing any flow-specific signalling at service access time;
- prior to the start of the actual flow, establishing two or more Interactive bearers, each with a different traffic handling priority;
- defining a traffic flow template (a filter) in the Gateway GPRS Support Node that maps downlink Packets to the different priority bearers based on priority marking of incoming Packets;
- mapping uplink Packets within the terminal to the different priority bearers based on the priority marking of the Packets that has been set by the application within the terminal or external to the terminal;
- a system whereby the service network of the operator can determine whether a certain subscriber shall be prepared for priority marking (with multiple priority bearers) or not, based on defined events (e.g. at IP connectivity, or accessing a certain webpage);
- a system the network can initiate the establishment of additional bearers and related traffic flow templates;
- a method for an operator to define which service classes different services are mapped to; how different service classes are mapped to the priority levels of the 3GPP bearers; and quality levels to achieve for the different 3GPP priority levels.

DETAILED DESCRIPTION OF THE ILLUSTRATIVE EMBODIMENTS

The details are described by the example embodiment below, showing how the following example services are supported:
Premium content download (requires QoS on download traffic)
Premium content upload (requires QoS on upload traffic)

Person-to-person communication (requires QoS on both download and upload).

The invention is however not limited to these use cases, but is also applicable to any type of service requiring certain quality of delivery, including person-to-person services.

Figure 1:
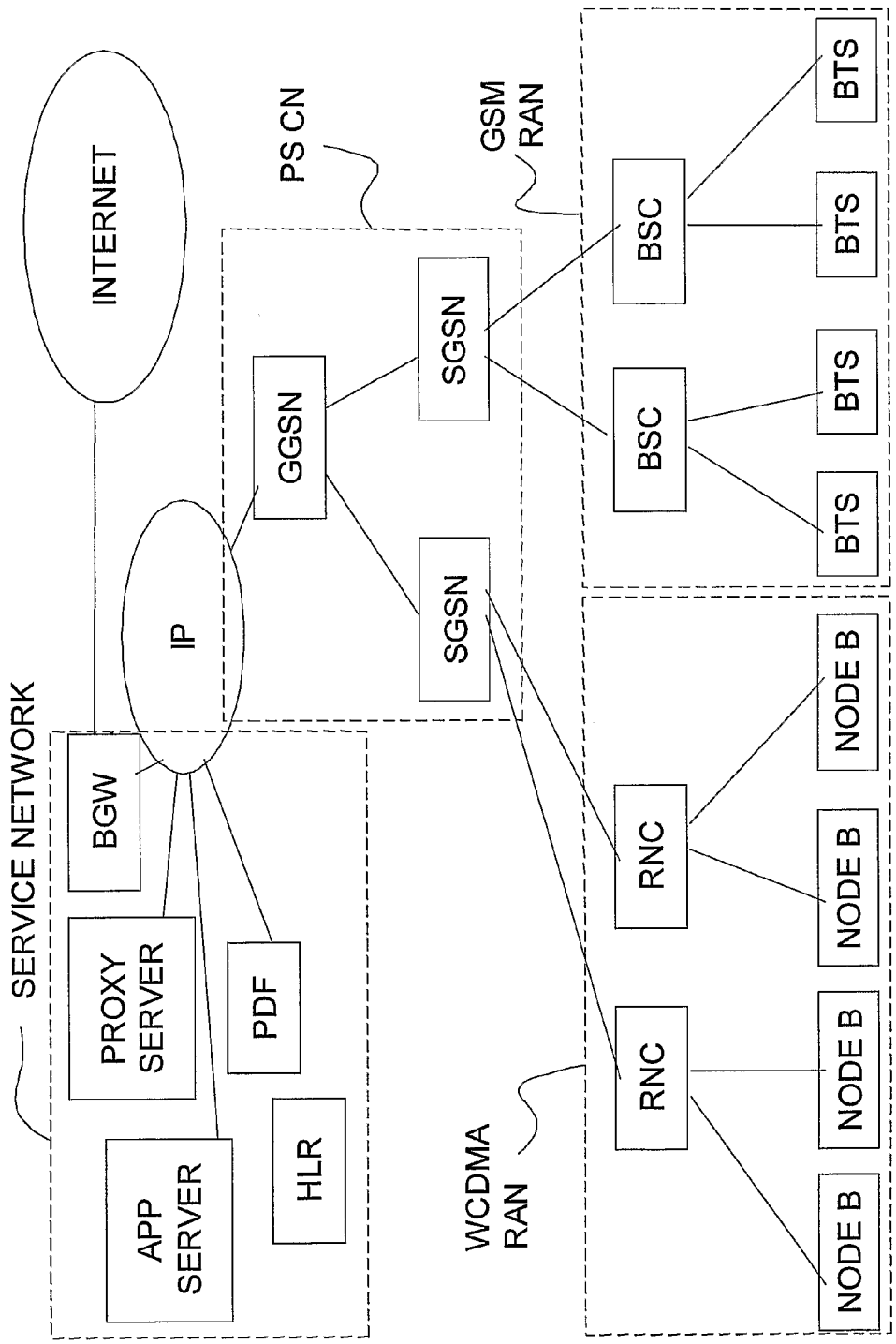
FIG. 1 shows the overall network architecture for a 3G mobile network (prior art).
Figure 2:
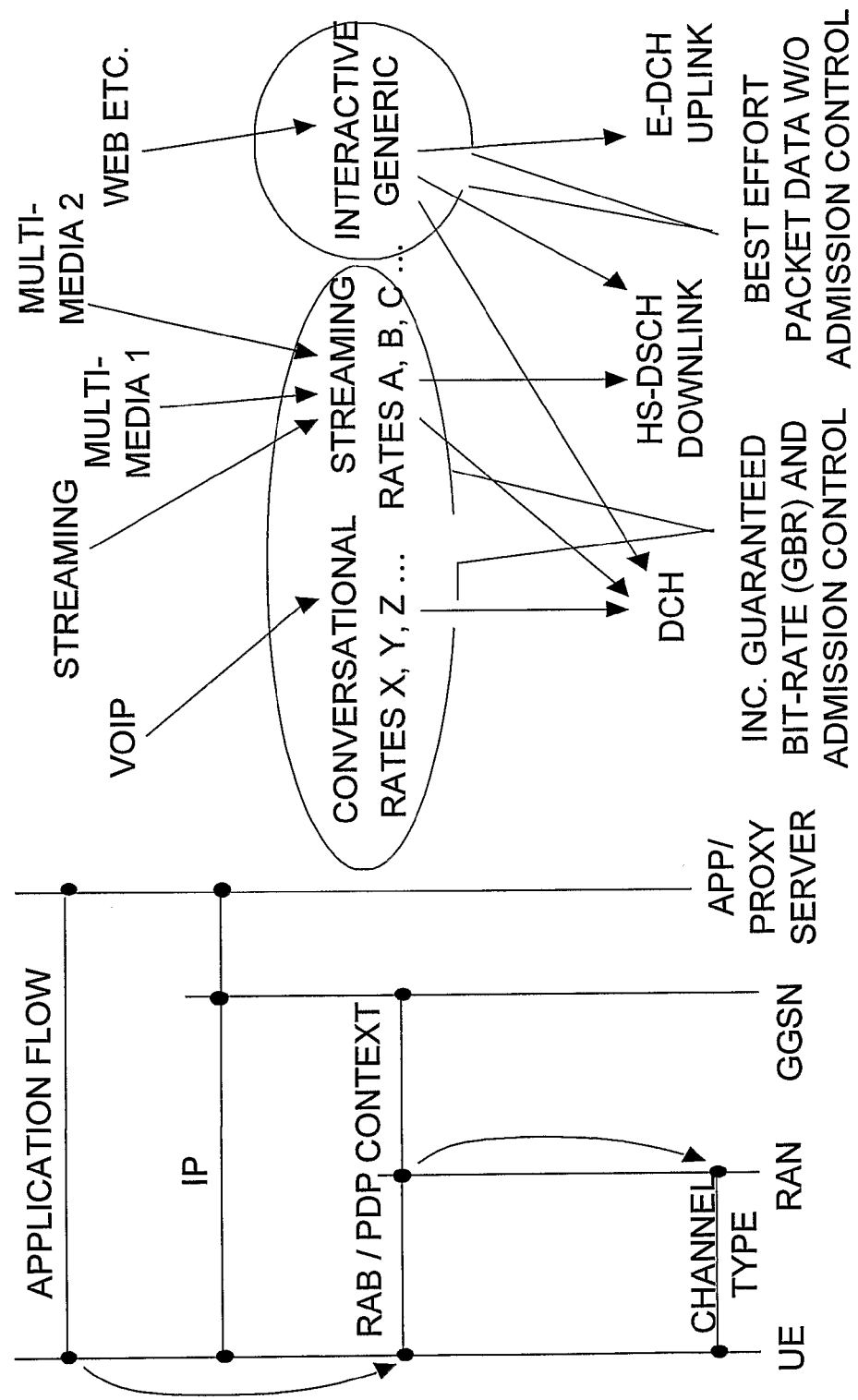
FIG. 2 shows the state of the art mapping of application flows to bearers and channel types.
Figure 3:
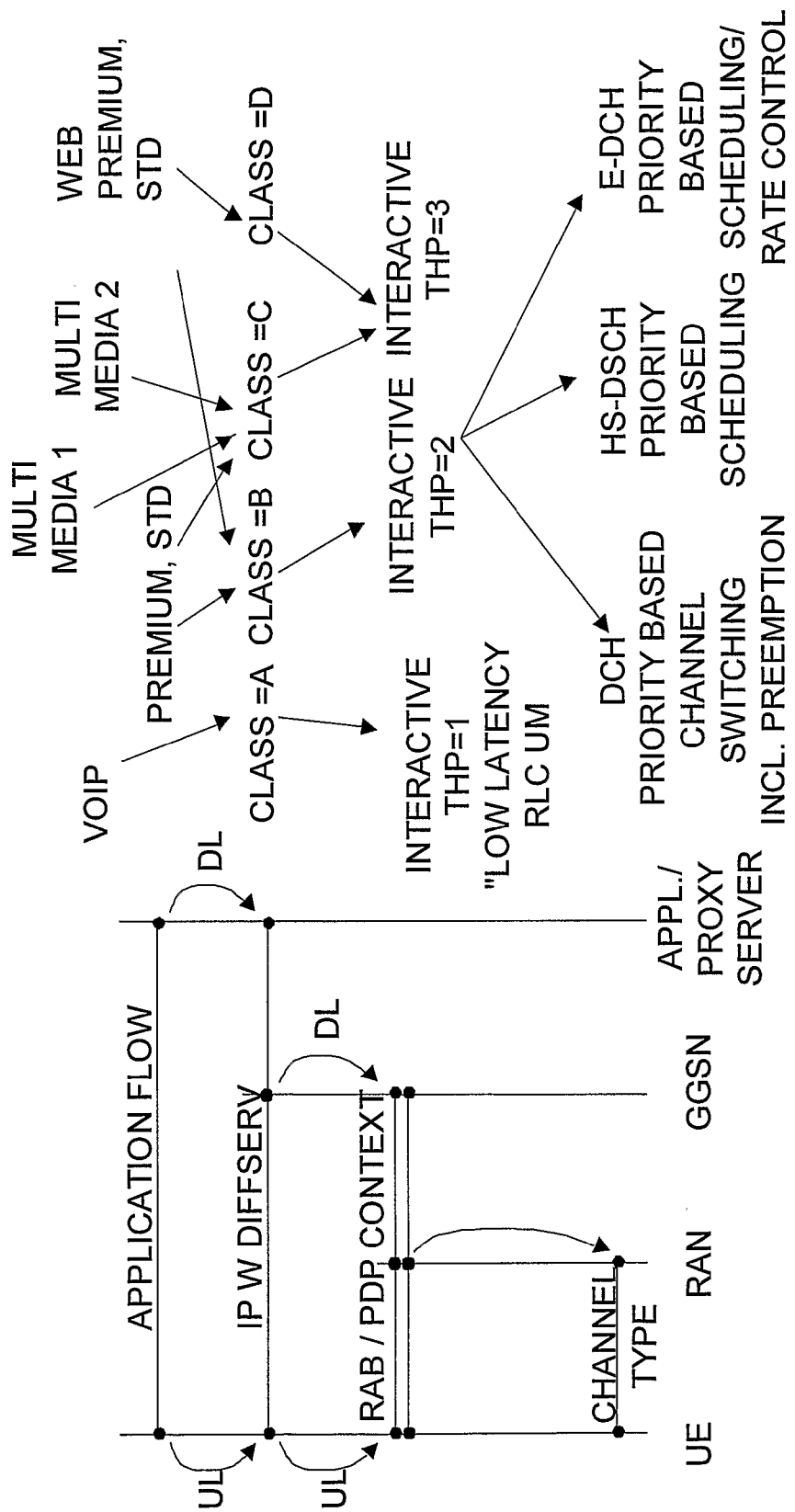
FIG. 3 shows the mapping of application flows to bearers and channel types according to the invention.

The description is made in the form of a use case as seen from the operator. The necessary actions needed are described for the following stages of the service life cycle:

Service Level Agreement (SLA) establishment
Service deployment
Service subscription
User access to network (QoS preparation phase)
Service usage (QoS execution phase)
Service monitoring FIG. 3 illustrates an example of mapping application flows to bearers and channel types according to the invention. The applications are mapped to a few IP traffic classes (priority levels), which in turn map to Interactive bearers of different priority level, and possibly with special handling of realtime (low-latency) traffic. The mappings are controlled by the operator, although for uplink flows they are implemented in the terminal. In this way, a common set of a few bearers can support a multitude of different applications.

Figure 9:
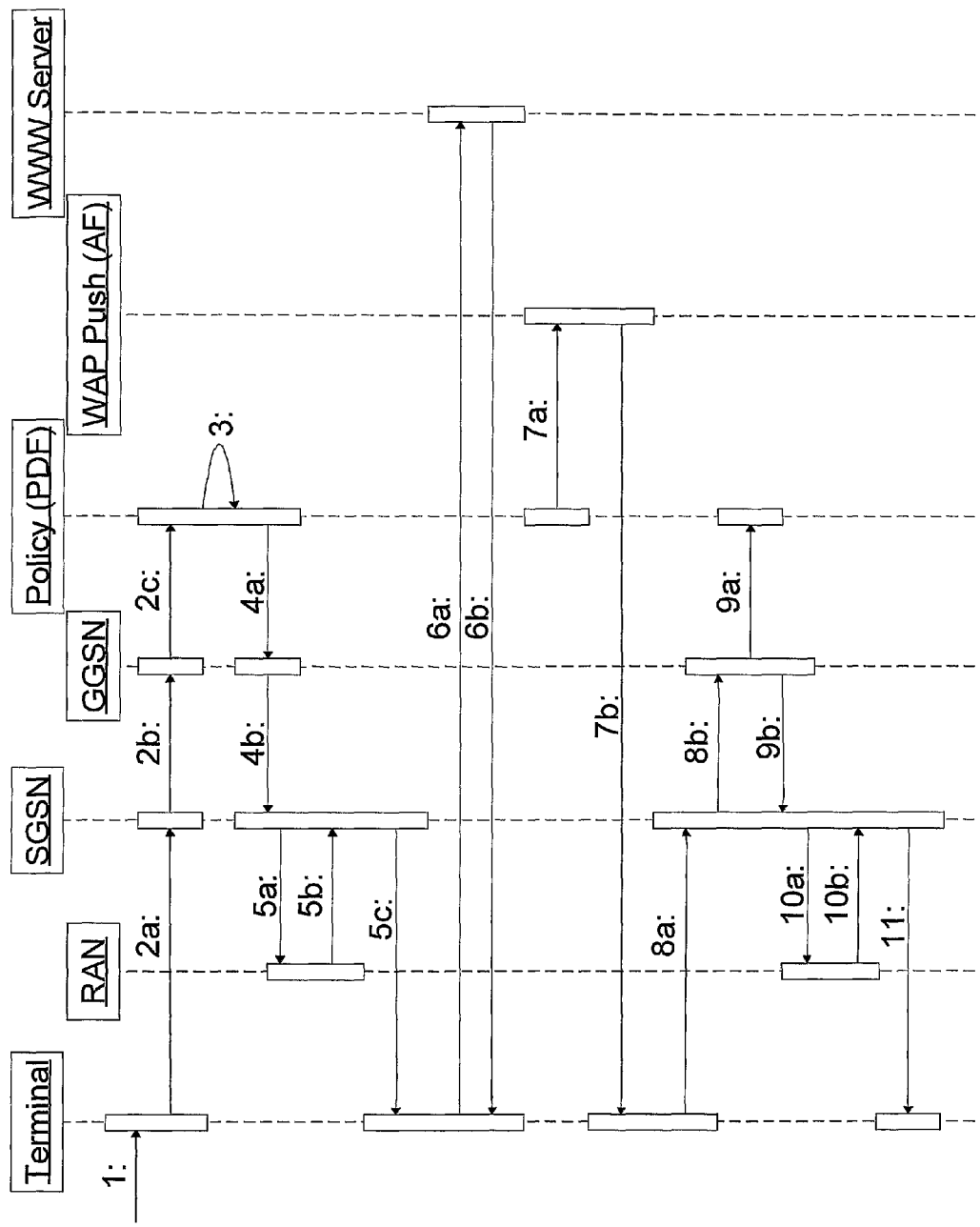
FIG. 9 shows an example of Pre-establishing RABs for Diffserv, in case of IP session initiation (QoS preparation phase).
Figure 11:
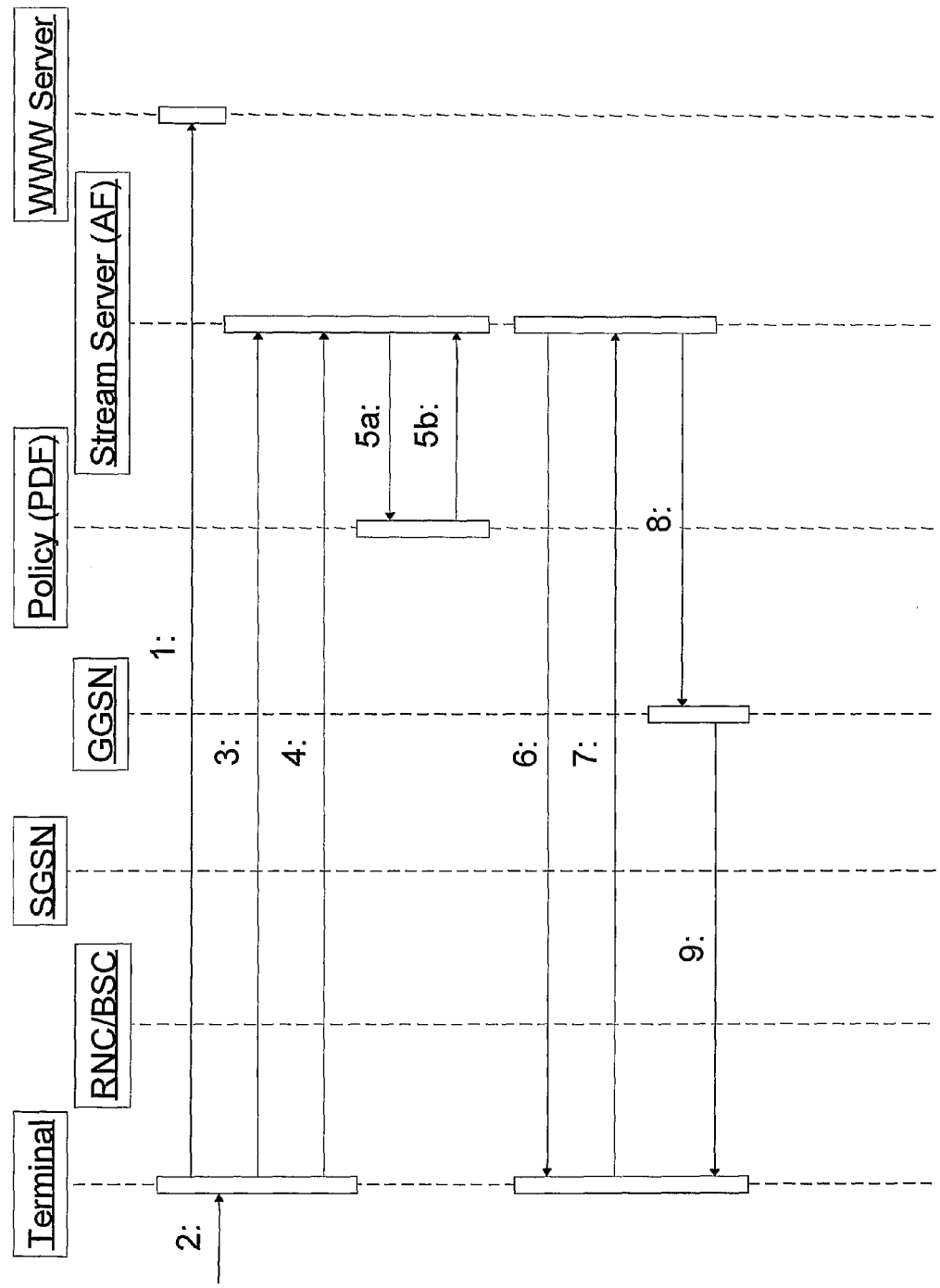
FIG. 11 shows a QoS execution phase, happening when the user accesses a specific service requiring QoS (QoS execution phase).

A key aspect of this invention is the distinction between a QoS preparation phase, as shown in FIG. 9, which happens already at user access to network (primary PDP Context establishment), and a QoS execution phase, as shown in FIG. 11, happening when the user accesses a specific service requiring QoS All phases except the Service usage phase (i.e. the QoS execution phase) are common for the different services.

In next example scenarios in which the present invention may be applied, the protocol Diffserv is named as a protocol to mark different types of Packets with a priority flag. The invention is however not limited to the use of specifically Diffserv as the method to mark the packets. In this description, the term Priority flag or priority marking should also cover the case of any Traffic Class indication, including indication of realtime vs non-realtime traffic.

The example scenarios show life-cycle use cases of a service.

Figure 6:
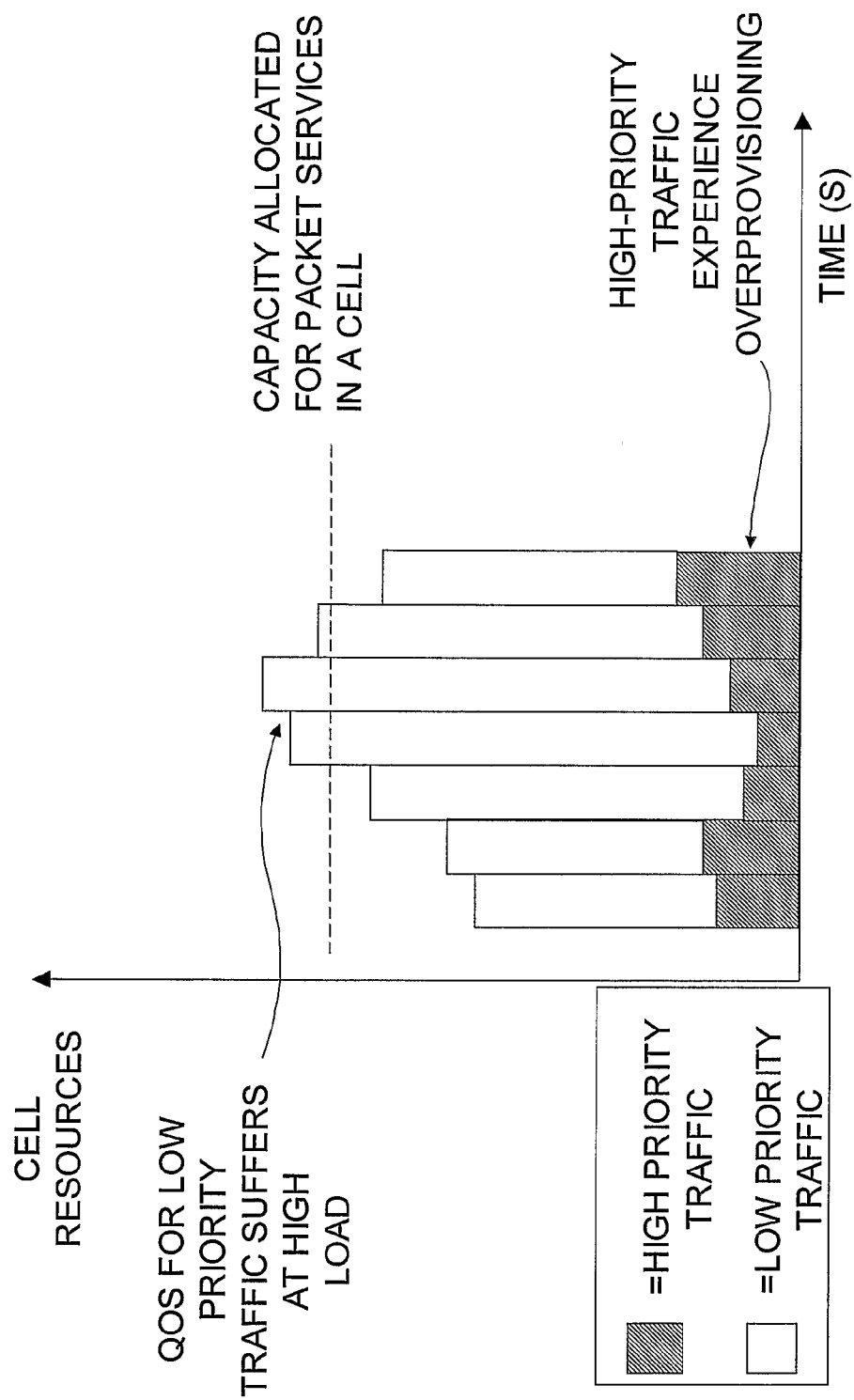
FIG. 6 shows how a cell can be dimensioned for a mix of traffic priority levels.

The first phase is Service deployment, which starts with SLA establishment, which includes:

Agreement between operator and service provider (if other than operator) to support priority delivery of certain premium content;

If possible, agreement between operators for supporting priority delivery also in visited network at roaming;

This first phase is followed by the phase of service deployment, which includes:

Defining a Diffserv policy within the operators network. If Diffserv is already used in the operator's backbone network the existing Diffserv classification may be reused. If the operator's backbone network does not support Diffserv adequately, the operator may establish tunnels between its sites, in which the Diffserv marking relevant for the mapping to radio interface bearers is encapsulated transparently to the backbone network;

Provision a policy into policy servers for deciding priority levels and a Diffserv Code Point (DSCP) to use for different services. A DSCP is a code used in the type of service (TOS) field in an IPv4 packet (or the Traffic Class field of an IPv6 packet) that is used to assign different types of service processing (expedited, assured, and default) for Packets that travel through the network;

Configuring application server and/or application proxy server to Diffserv mark premium content flows for priority delivery;

Dimensioning and configuring a radio access network to achieve desired accessibility and integrity given an assumed service load. This may include the possibility to reserve bandwidth on cell level for interactive traffic. FIG. 6 illustrates the principle that as long as high priority traffic is not dominating, it will experience a good QoS in a well dimensioned network.

For HSDPA, signalling may be added to the current standard, to be able to indicate from a radio network controller to a base station to reserve a certain minimum amount of power for the high-speed channel;

Configuring a Diffserv ingress function towards incoming Internet traffic for remarking and policing incoming Diffserv flows;

Configuring a function to police uplink flows from the terminal, to not exceed the policies set by the operator;

Optionally, configuring an admission control function in the service network to limit aggregated bandwidth of priority flows in the network on a fine or coarse level;

The operator negotiating support in terminals with terminal vendors;

The operator making sure that terminals include a policy driven Diffserv/Type of Service marking of uplink flows. The policy can be updated from the operator by a procedure over the air interface.

The second phase is service subscription, which includes that data of a Home Location Register (HLR), holding the subscription and other information about each subscriber authorized to use the wireless network, are set to allow maximum traffic handling priority (THP) for the user. In this way the control of allowed THP levels is moved from HLR and SGSN, where THP usage is limited to subscription data, to the policy control in the service network, where a more flexible use of THP can be achieved.

The third phase referred to as "QoS preparation phase" involves user access to a network. At IP Session initiation, the following is needed to prepare for the QoS solution. As illustrated by FIG. 9, next steps occur.

Step 1 The User starts the browser of the Terminal

Step 2 The UE requests (Step 2a) a primary PDP Context (i.e. associated with an Internet Protocol (IP) address), possibly with Traffic Handling Priority="Subscribed" (i.e. highest allowed). This is called PDP1 in the following. The SGSN needs to check (Step 2b) with GGSN before RAB establishment for primary PDP Context. The GGSN checks (Step 2c) QoS and MSISDN.

Step 3 The policy control (Policy Decision Function) ensures that primary PDP Contexts always get low priority. In this case, e.g. based on subscription data (e.g. does the user subscribes to premium content services at all?), the network decides to prepare the connection for Diffserv. In this example it is assumed that two priority levels are enough. The priority level assigned to the high priority bearer could also take into account a subscription level, such as "Gold", "Silver" or "Bronze" In this case the used THP may be based on a combination of subscription level and application requirements. The trigger for preparing for Diffserv may be based on other user actions such as access to a specific URL.

Step 4 The potentially needed downgrade of priority for the primary PDP context is signalled back through the GGSN (step 4a) and to the SGSN (Step 4b).

Step 5 The SGSN establishes the RAB in the RAN for the primary PDP Context, RAB1, with a low THP (lower than allowed by HLR data.) by means of a RAB assignment Request (Step 5a). SGSN needs a function to ensure low THP for primary PDP Context of visiting roaming subscribers. What follows is a RAB Response (Step 5b) by RAN to the SGSN. The SGSN sends a PDP Context Activation Accept to the Terminal (Step 5c).

Step 6 As soon as the primary PDP Context is established, the user can start browsing, by means of the messages HTML/WML GET to the WWW Server, which is followed by a HTML/WML OK message from the WWW Server to the Terminal. This process is in parallel to the following steps.

Step 7 The PDF sends a Push message (Step 7a) to Activate Secondary PDP Context to the WAP Push Application Function (AF). The service network (WAP Push AF) triggers (Step 7b) the terminal to establish a secondary PDP Context (i.e. to the same IP address), with QoS="high priority interactive", and with a Traffic Flow Template (TFT) matching the Diffserv policy of the operator. A mechanism for the network to trigger the terminal to establish secondary PDP Context with QoS needs to be standardized. In this example, it is assumed that this is specified as a Wireless Application Protocol (WAP)-Push mechanism (carried on primary PDP Context). An alternative could be to specify this as a new GPRS Session Management procedure, whereby the network requests the terminal to initiate a secondary PDP context with a new message of the Session Management protocol in 3GPP 24.008. In any case, the information to be included in the message to the terminal is:

QoS: Interactive class, THP=x

TFT-Downlink (DL): defines which IP packets, based on TOS values, that can use this RAB/PDP context for downlink traffic (ports/addresses unspecified)

TFT-Uplink (UL): defines which IP packets, based on TOS values, that can use this RAB/PDP context for uplink traffic (ports/addresses unspecified)

Possibly a binding reference to be included in the PDP context activation from the terminal Step 8 The terminal starts a normal procedure for secondary PDP Context establishment with a message through the SGSN (Step 8a) to the GGSN (Step 8b), including the QoS and TFT-DL parameters given by the network. This high-priority bearer is called PDP2 in the following.

Step 9 GGSN checks (Step 9a) with service network that the policy allows this bearer to be established. Since the service network triggered this bearer, it is allowed. The possible binding reference is used to check that this PDP Context indeed corresponds to the one earlier requested from the network. The GGSN Creates a PDF Context Response and sends it to the SGSN (Step 9b).

Step 10 The RAB2 for the secondary PDP Context is established by the RNC by sending from the SGSN a RAB assignment Request to RAN (Step 10a) and sending a RAB Response from RAN to the SGSN (Step 10b). Since it is an interactive RAB, no radio resources are reserved for it, and it is always admitted by the RNC. RAB2 has higher traffic handling priority than RAB1. The details on how the RAN prepares and implements the priority handling depends on the channel type, and is described in more detail further down.

Step 11 The SGSN sends a message for Secondary PDP Context Activation to the Terminal.

After this preparation phase, the different nodes are ready to handle both downlink and uplink IP packets according to the DSCP/TOS fields of the packets. The RAN is ready to handle downlink and uplink traffic with different priorities, depending on whether the data arrives on RAB1 or RAB2.

The GGSN is ready to map downlink Diffserv packets onto RAB1 (primary PDP Context) or RAB2 (secondary PDP Context), according to DSCP/TOS values in the TFT-DL.

For downlink traffic, the terminal is ready to receive data on any of its PDP Contexts/RABs. There is no linking between sockets and PDP Context in the terminal. The terminal will only use port numbers to route a downlink packet, regardless of which PDP Context/RAB was used to transfer it.

For uplink traffic, the terminal is prepared to use the TFT-UL received in step 6 above, to map uplink packets onto the RAB/PDP context associated with the DSCP/TOS field of the packets.

Figure 10:
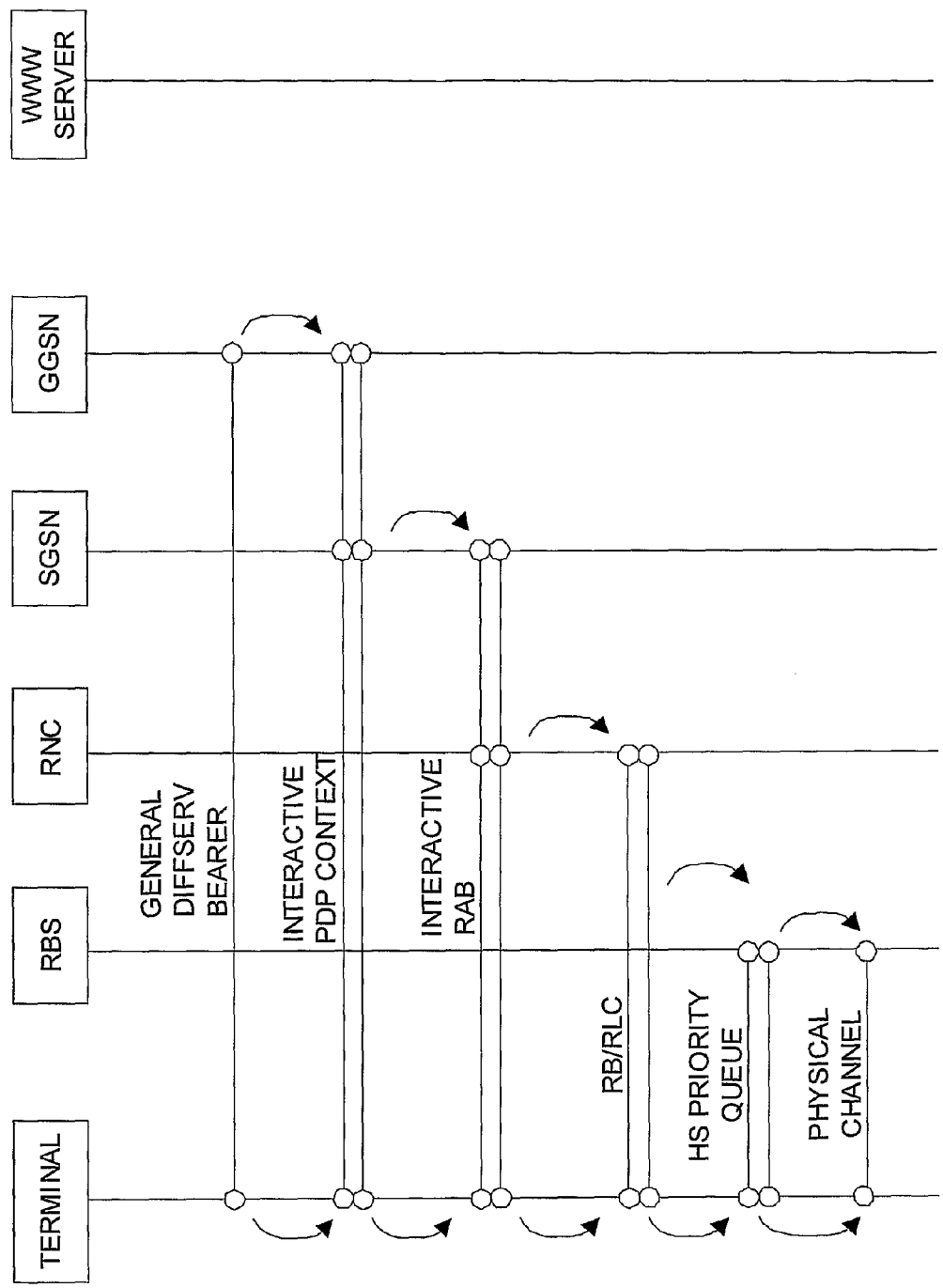
FIG. 10 shows the bearer configuration after the QoS preparation phase, for the case when the channel type is WCDMA High-Speed Downlink Share Channel (HS-DSCH).

FIG. 10 shows the bearer configuration after the QoS preparation phase, for the case when the channel type is WCDMA HS-DSCH.

The HS-DSCH is a WCDMA channel that allows multiple devices to share a high-speed communication channel through packet scheduling in the base station, including use of priority levels.

A general Diffserv bearer is thus realized between terminal and GGSN, by use of multiple Interactive RABs/PDP contexts.

A variation of the embodiment of the "QoS preparation phase" would be that the network broadcasts a new type of information, indicating to terminals that in this network, multiple parallel bearers should always be set up whenever setting up the primary PDP context. This new broadcast information would include QoS, TFT-DL and TFT-UL of each additional PDP context to be set up, and would replace signals 7a and 7b of FIG. 9.

The fourth phase is referred to as the QoS execution phase, which involves service usage. This phase is illustrated by means of three examples services. The first example service comprises "Premium content download". Described is a sequence for premium content delivery of a streaming service (e.g. video clip) from the operator to the user. In this example, the streaming server acts as the Application Function (AF) within the operators service network. The invention is as well applicable if "streaming server" is exchanged for "application proxy server", i.e the Application Function involved in the signalling shown is implemented by a proxy server in the operators service network.

As illustrated by FIG. 11 at the time the user accesses the service next steps occur:

Step 1 The user browses and locates the service. In this case the low priority RAB/PDP context (PDP1) is used, because web browsing traffic is assigned a low priority DSCP (DSCP), which code is used in the TOS field in an IP packet that is used to assign different types of service processing (expedited, assured, and default) for packets that travel through the network.

Step 2 The user clicks on a link to start the streaming download service.

Step 3 The streaming server describes the streaming content to the terminal. The terminal should not initiate a separate bearer for the streaming flow based on this.

Step 4 The streaming client sets up the streaming service, including request of a certain bit rate, and exchange of port numbers.

Step 5 The streaming server does a policy check (Step 5a) to check that subscriber is allowed to access premium content. Potentially, an admission control function in the service network may be requested to admit/reject bandwidth for the high-priority flow. This could be done on a coarse, aggregate level, or on a finer level by having information about radio network load continuously sent from radio access network to the admission control function in the service network, or on a finer level by letting the admission control function in the service network explicitly ask the radio access network whether the load currently would allow for this flow. Additionally the policy function may check that the preparation phase has indeed ended successfully, so the terminal is Diffserv prepared. A policy check OK message is sent from PDF to Stream Server (AF) (Step 5b).

Step 6 The streaming server responds to the streaming service setup.

Step 7 The client initiates the service delivery.

Step 8 The streaming server delivers the premium content in RTP packets marked with Diffserv priority (as configured at service deployment). The GGSN maps the packets to the high-priority bearer PDP2/RAB2 (secondary PDP Context) based on the DSCP/TOS field. If the streaming server is outside the operators network (thus outside the operators Diffserv domain), the traffic need to pass a DS Ingress node (or a general flow inspecting node) that does policing and possibly remarks the packets. E.g. enforce high-priority packets only for certain source IP addresses. It could also identify IP flows and set a high priority DSCP for these flows.

Step 9 The RAN (through the GGSN) treats data on RAB2 with priority over this and other users low-priority interactive data, using different means available in the RAN. A pre-emption based mechanism needs to be in place, i.e. the possibility for high-priority data to steal resources from ongoing low-priority data flows. When mapping the packet traffic to DCH, the RAN may decide to switch down a low-priority user from a high DCH rate to a lower rate, or even to Forward Access Channel (FACH), which provides control and data messages to mobile devices that have registered with the system, in order to make room for the high-priority data on a high DCH rate. When mapping the packet traffic to HS-DSCH, the RAN decides to base the scheduling of data on the shared HS-DSCH using the priority levels of the different bearers.

Note that the operator may configure different rules in Step 5 for deciding what priority level a certain application flow should be associated with. These rules may include:
the type of application flow, e.g. port numbers, protocol ID;
a service level, e.g. "premium" or "non-premium" service;
a charging level, e.g. if expensive charging level may lead to use of high priority level;
a URL or IP address of an application server, e.g. useful when the application server is at a third party service provider network;
a general subscription level of the subscriber, e.g. a "Gold" subscriber gets certain services delivered with higher priority;
whether the subscriber is authorised to activate the service.

Also note that the implementation of the priority marking of the packet according to such rules can be done not only in the application server, but also in a flow inspecting node between the application server and the GGSN.

A second example service comprises a "person to person service".

Figure 12:
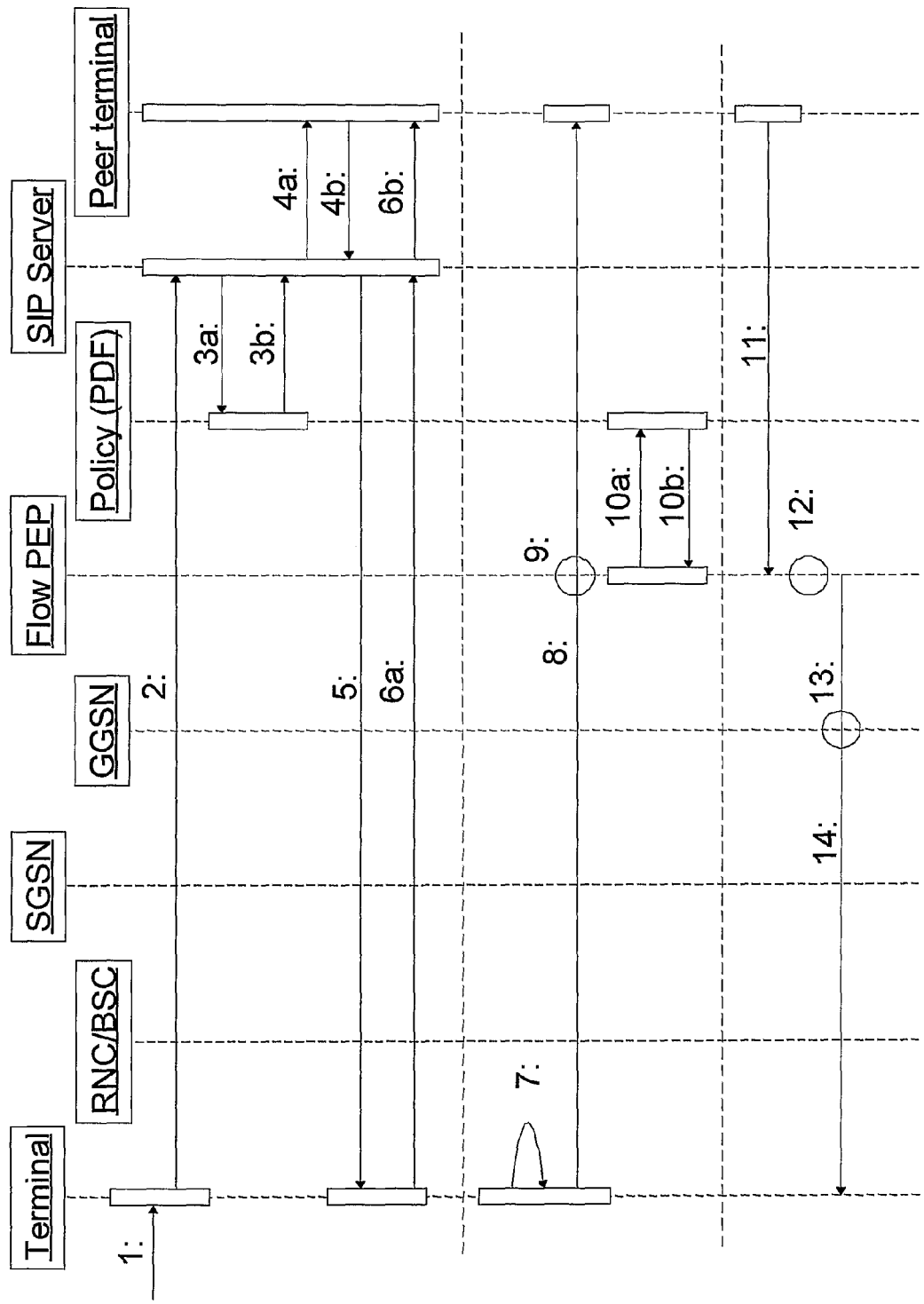
FIG. 12 shows an example of pre-establishing of RABs for Diffserv in a person-to-person scenario (QoS execution phase).

The signalling in this case shows the usage of the Diffserv priority method at one of the accesses. The network of the peer terminal may use the same or another QoS method. As illustrated by FIG. 12 next steps occur, with the exemplary use of the Session Initiation Protocol (SIP) messages. SIP is an application layer protocol that uses text format messages to setup, manage, and terminate multimedia communication sessions. Note that SIP server in the following could be any SIP proxy or redirect server, including IMS (IP Multimedia Subsystem) nodes such as CSCF as specified by 3GPP.

First there is an application signalling phase:

Step 1 The user initiates a person-to-person communication service.

Step 2 The SIP Invite (message that is used to invite a person or device to participate in a communication session) includes a description of the media flow(s) to establish, including IP address and port number for each flow for the peer terminal to use.

Step 3 The SIP server within the operators network checks (Step 3a) with a policy function. It receives (Step 3b) the DSCP/TOS marking that the terminal should use for its uplink flows.

Step 4 The SIP Invite is sent (Step 4a) to the peer terminal, which responds with a SIP Invite Response (Step 4b). The response includes IP address+port number for each of the media flows to be received by the peer terminal. In case the network of the peer terminal also applies the Diffserv solution, that network will insert the DSCP/TOS marking for each media flow that will originate from the peer terminal, into the SIP Invite message sent to the peer terminal.

Step 5 The DSCP/TOS value for each uplink media flow is included in the SIP INVITE RESPONSE. The terminal will use these values for Diffserv marking in the uplink.

Step 6 The SIP ACK (message that is used to confirm a person or device is willing to participate in a communication session) from Terminal through SIP Server (Step 6a) to Peer Terminal (Step 6b) concludes the signalling phase.

Figure 7:
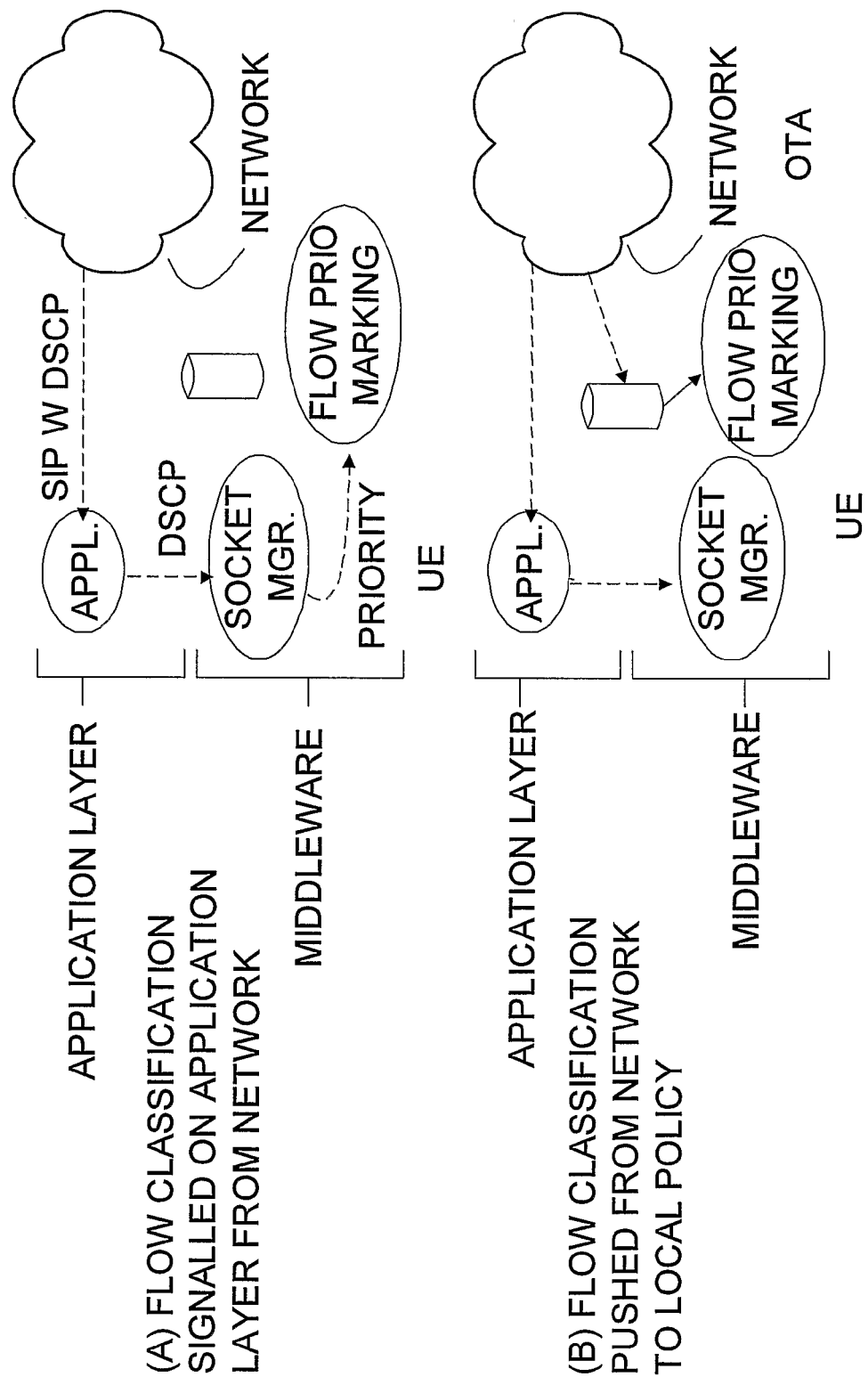
FIG. 7 shows two alternatives for how to control the priority marking of uplink packets in the terminal.
Figure 8:
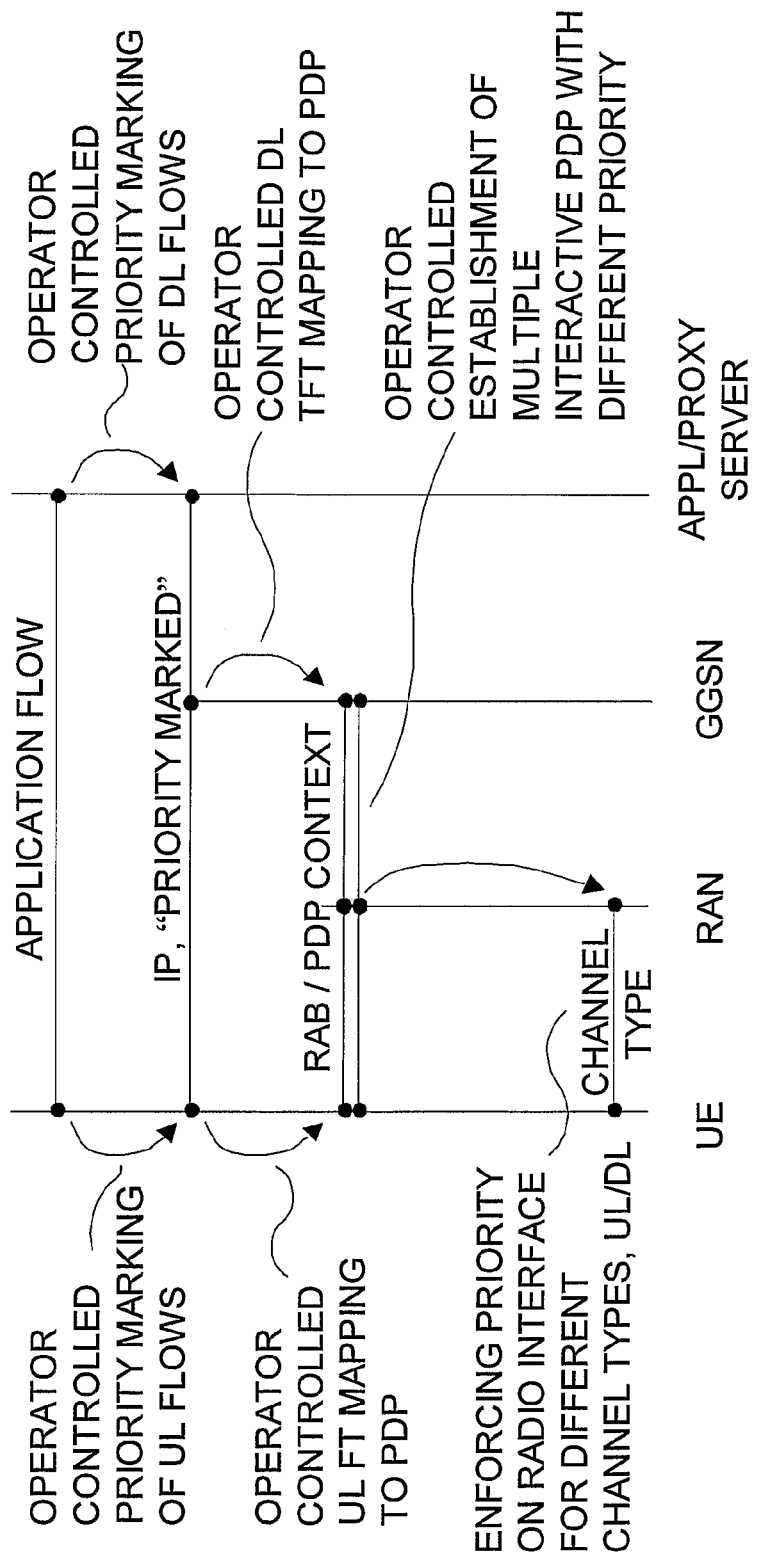
FIG. 8 shows the main components of the invention, each of these components are described in more detail in the various examples of the detailed embodiment.

What follows is the uplink data flow:

Step 7 Within the terminal, the following happens:
A priority marking function, or the application itself, marks the IP packets with a DSCP/TOS value according to the value(s) received in the application level signalling. If the priority marking function is part of the terminals middleware, the DSCP received by the terminals application may be passed to the terminals middleware when requesting a socket from the socket manager of the terminals IP stack for this flow. This is illustrated in FIG. 7 as case "a".
The packets are sent to the terminals IP stack
The TFT-UL filter decides which PDP context to use for each packet based on the DSCP/TOS value. The TFT-UL filter was downloaded from the network in the QoS preparation phase.

Step 8 The terminal sends uplink RTP flow on the high priority RAB/PDP context (PDP2), in IP packets marked with a TOS value indicating high priority.

Step 9 A flow detection function, also working as a Policy Enforcement Point (PEP), in the operators network detects this as a high priority Diffserv flow.

Step 10 The policy decision function is asked through a policy check (Step 10a and Step 10b) whether this service is correctly marked as a high priority flow, and possibly whether this user is authorized to use this high priority service. In case the terminal has not had the right to use the current DSCP/TOS value, this function may stop the application flow, and display an error message to the user.

If the application server is outside the operators network (thus outside the operators Diffserv domain), the traffic need to pass a DS egress node (AWN function) that does policing and possibly remarks the packets.

Next steps show the downlink data flow:

Step 11 Packets arriving from the peer terminal may or may not already be DSCP/TOS marked.

Step 12 A flow policy enforcement function in the operators network detects the packets of the application flows, and, if needed, (re)marks the packets with DSCP/TOS values according to the operator's policy.

Step 13 The RTP packets are mapped by the GGSN to the PDP context based on the DSCP/TOS marking and the TFT of the PDP context.

Step 14 In this case the packets are sent on the high priority RAB/PDP context (PDP2).

In the example as described in FIG. 12, the SIP signalling was mapped to the low-priority bearer. If SIP signalling was to be mapped to a high-priority bearer, then a method as described in the following third example may be used.

Figure 13:
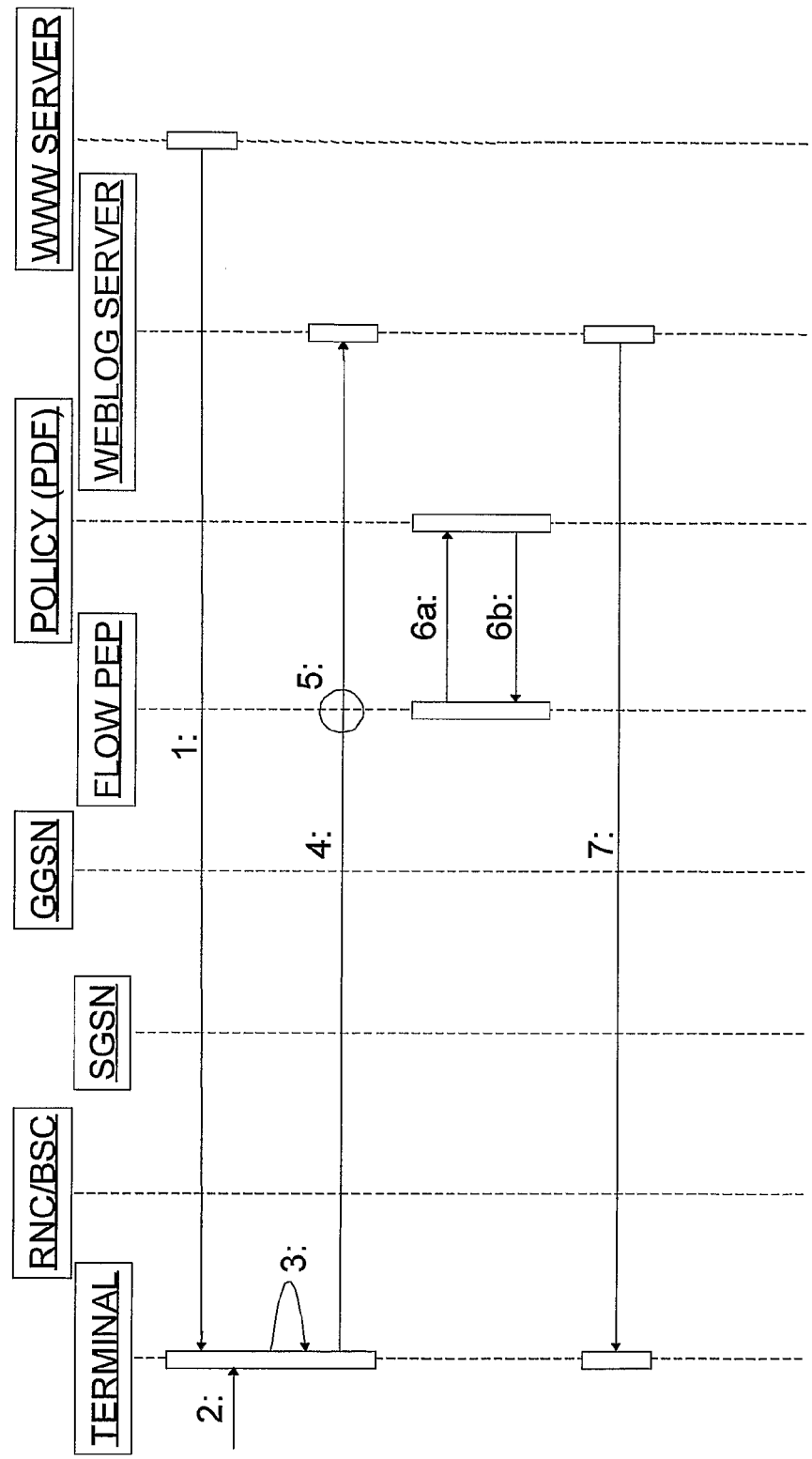
FIG. 13 shows an example of pre-establishing of RABs for Diffserv in a premium content upload scenario (QoS execution phase).

The third example comprises "Premium content upload". This example shows the case where there is no application level signalling prior to the start of the uplink data flow, which could have been used for the operator to control the DSCP/TOS marking of the packets of the flow. As illustrated by FIG. 13, next steps occur.

Step 1 The user browses and locates the service. Web browsing traffic is assigned a low priority DSCP, thus using the low priority RAB/PDP context.

Step 2 The user initiates the upload of a file to a URL. The operator has defined this service as a high-priority service.

Step 3 Within the terminal, the following happens:
A priority marking function, or the application itself, marks the IP packets with a DSCP/TOS value according to the locally stored policy. The locally stored policy may have been configured dynamically from the network, using similar mechanisms as used today to configure e.g. MMS in mobile terminals, i.e. using OTA (Over-The-Air) provisioning. This is illustrated in FIG. 7 by case "b".

If the application resides in a laptop external to the terminal, the operator could take control by providing the user with the application software as part of the subscription package. Thus the application software could be controlled to deliver correctly marked packets.

The packets are sent to the terminals IP stack

The TFT-UL filter decides which PDP context to use for each packet based on the DSCP/TOS value. The TFT-UL filter was downloaded from the network in the QoS preparation phase.

Step 4 The terminal sends the file to upload on the high priority RAB/PDP context, in IP packets marked with a DSCP/TOS value indicating high priority.

Step 5 A flow detection function, also working as a Policy Enforcement Point, in the operators network detects this as a high priority Diffserv flow.

Step 6 The policy decision function is asked whether this service is correctly marked as a high priority flow, and possibly whether this user is authorized to use this high priority service. In case the terminal has not had the right to use the current DSCP/TOS value, this function may stop the application flow, and display an error message to the user.

Step 7 The response could in this case be mapped either to RAB1 or RAB2.

If the application server is outside the operators network (thus outside the operators Diffserv domain), the traffic need to pass a DS egress node (or a general flow inspecting function) that does policing and possibly remarks the packets. Note also that what in the above was referred to as a Weblog server, may actually be an application proxy server within the operators network.

The sixth phase is called "Service monitoring"

In this phase the operator monitors the high priority traffic load and delay performance, in order to extend the network capacity and take other actions to tune the network, when needed to fulfil the service requirements.

Next examples in which the present invention may be applied describe ways of implementation of priority handling in a Radio Access Network, depending on the Radio access network type and channel type.

A first example of this implementation is described for a WCDMA HS-DSCH. For each interactive RAB with a given THP, the RAN sets up a separate priority queue in the base station, with a specific HS priority level, according to current specs. Packets arriving at a RAB with a given priority, are (after necessary segmentation in the RNC), forwarded to the corresponding priority queue in the base station. The base station schedules transmission on the radio interface, including the HS priority level as one of the inputs to the scheduling algorithm. Whether to apply strict priority scheduling or a softer variant is open for the vendor/operator to decide. The priority is preferably combined with other parameters to form the final scheduling decision, e.g. the channel quality estimates from the terminal. The actual characteristics achieved for each priority level will depend on parameter settings configured in the base station for each priority level.

To achieve the desired characteristics on the high priority traffic, the network must be dimensioned so that enough capacity in each cell is available for the Packet Switched traffic. This means that it should be possible to reserve capacity, including downlink power, for HS-DSCH in a cell, so that speech users do not starve the capacity available for PS traffic.

A second implementation example concerns a WCDMA dedicated channel (DCH). The different interactive RABs may be mapped to one DCH, using Medium Access Control (MAC) level multiplexing, or several. In any case, the RNC can prioritise between bearers by the following means:

By taking priority level into account in the channel switching function, i.e. when deciding which bearers/users to switch from FACH to DCH, and which DCH rates to establish. If a packet arrived on a high priority bearer, but an upswitch of DCH rate is inhibited by congestion in the cell, then a pre-emption mechanism is implemented such that the RNC decides to downswitch a low-priority bearer to free resources for the high priority bearer. This mechanism can be used for both link directions together or independently of each other.

On a more dynamic level, the RNC can at MAC level, by TFC (Transport Format Combination) selection, decide how to prioritise between different flows, between different terminals in the downlink direction. Correspondingly, by use of the TFC control procedure, the RNC can exercise this control for uplink traffic.

A third implementation example concerns a WCDMA Enhanced uplink. For the Enhanced uplink, which is not finally specified yet, different types of scheduling are discussed:

Rate scheduling, whereby the RBS limits the maximum rate a single user may use. Enforcing the priority can be done by controlling the max rate individually for the different bearers and/or users in the cell, in which case the RBS is informed by the RNC about the priority level of different bearers and/or users, or by broadcasting the max rate limitation common for all traffic of a given priority class in the cell;

Time scheduling, whereby the RBS controls which user(s) is allowed to transmit in individual time intervals slots. Here, the priority level information received from the RNC is used as an input to the scheduling decision, when multiple terminals contend for the channel.

The present invention is supporting traffic differentiated with Diffserv by multiple generic bearers supporting priority scheduling between traffic flows. These generic bearers are naturally optimised for TCP type of traffic, not dropping any packets by use of a persistent Radio Link Control (RLC) retransmission. An additional optimisation for real-time traffic is to define that one of the multiple bearers has a low-latency characteristic, but allows some packet dropping. Real-time traffic with strict delay requirements, such as Voice-over-IP, would then be mapped to a traffic class (DSCP/TOS value), that in turn is mapped to this low-latency bearer.

The realisation of this bearer in WCDMA may include one or more of the following:

Using Unacknowledged Mode RLC (i.e. no retransmissions) (as opposed to using Acknowledged mode which is normally used by the generic Interactive bearer);

Operating the bearer with stricter Block Error Rate targets (to limit packet loss);

Applying ROHC (Robust Header Compression) to the IP packets transmitted on this bearer;

Handling contention to resources with the same priority mechanism as described above (using no resource reservation on bearer level);

Using queuing time and a delay threshold as input to scheduling decision (e.g. HS-DSCH) to prioritise the most urgent packets in scheduling;

Using a delay threshold and discard packets that have been queued longer than this threshold.

In the signalling described above for establishing the bearers, the low-latency bearer may be indicated for example in one of the following ways:

Signalling an Interactive bearer, including a new latency attribute, and with a high THP value;

Signalling a conversational bearer, implying low latency and high priority, and with guaranteed bit rate set to zero, implying no resource reservation;

Signalling a conversational bearer, where the RAN ignores the guaranteed bit rate and assumes high priority and low-latency based on the use of Conversational class;

In this way, also real-time traffic can be supported by the concept of multiple generic bearers, established in advance of the actual flows.

Figure 4:
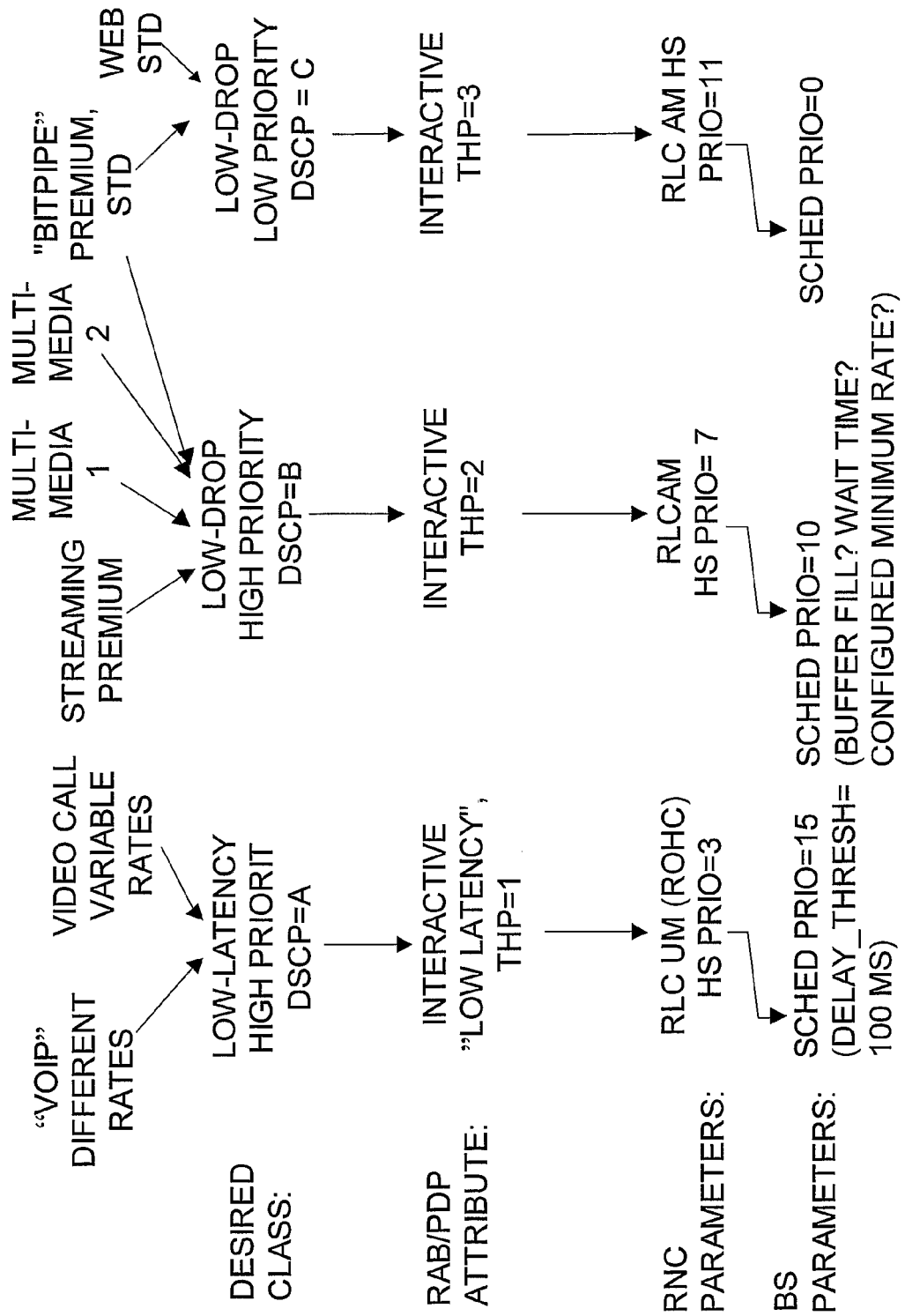
FIG. 4 shows a detailed mapping of application flows to bearers and channel in case of a WCDMA HS-DSCH channel type.

FIG. 4 illustrates how the WCDMA RAN can execute priority handling between a few different types of applications when using the HS-DSCH channel. The low-latency bearer for realtime traffic (e.g. VoIP) is in the RNC mapped to Unacknowledged Mode RLC, and possibly the use of ROHC. The high priority THP value is mapped to a high HS priority value, which is signalled to the base station when setting up the HS priority queue. The base station uses the HS priority value to determine which of the preconfigured scheduling algorithms and parameters to use. In this case a parameter giving high scheduling priority, and a delay threshold parameter limiting latency, is applied. For the other two bearers, RLC Acknowledged Mode is used, and other HS priority values are signalled to the base station. The base station then selects other scheduling parameters for this traffic. Possibly additional parameters for the medium priority level could be factors for buffer fill level, buffer waiting time or a configured minimum rate for that traffic class.

Figure 5:
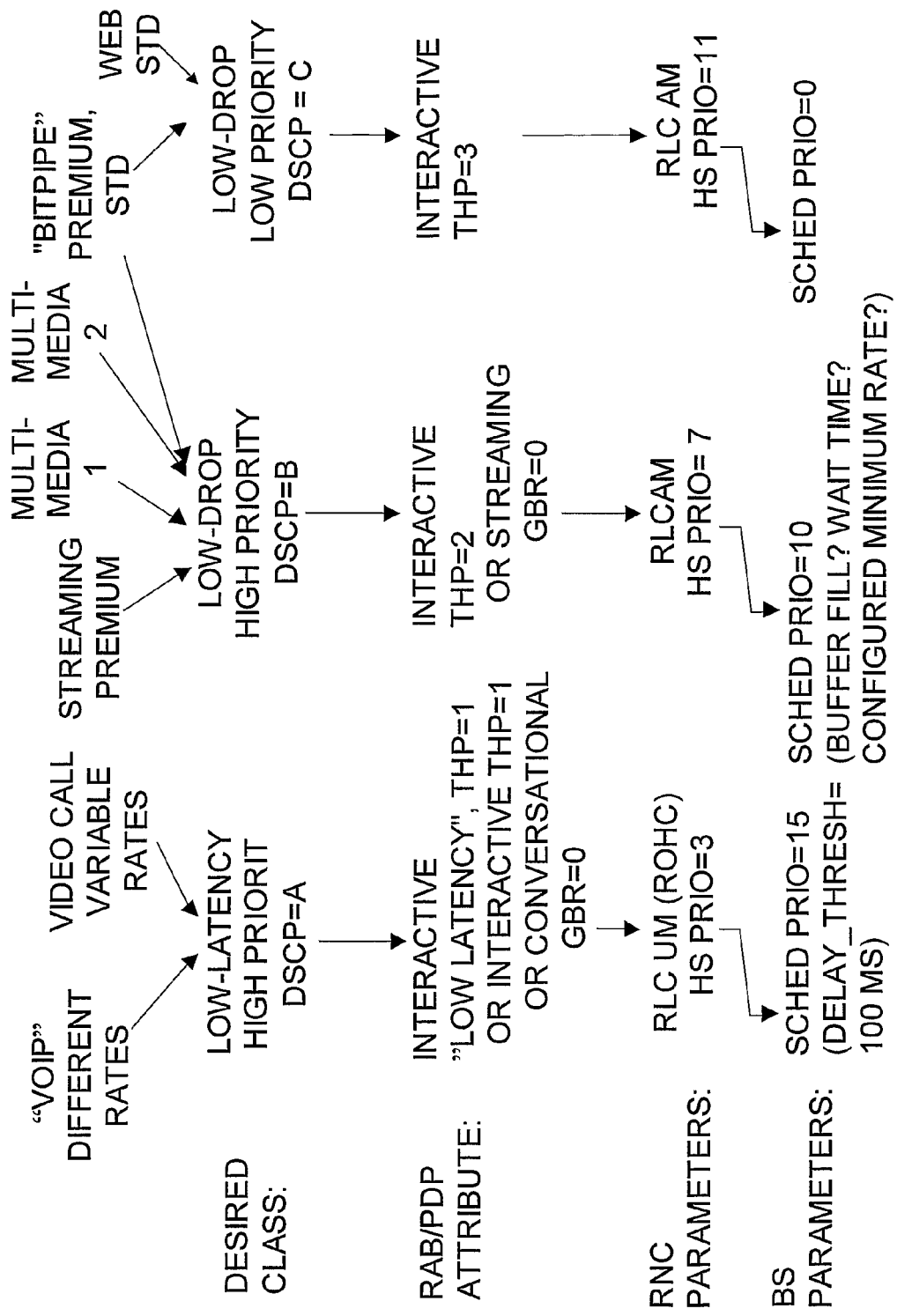
FIG. 5 shows a variation of the detailed mapping to HS-DSCH using alternative bearer types.

FIG. 5 illustrates the possibility to use other bearer types than Interactive, e.g. conversational for the low-latency traffic class, but still use the same mechanisms in RAN as if the bearer was of type Interactive. Thus no resource reservation is done for these bearers. It is merely a different way to signal to the RAN what general characteristics should be provided for traffic on that bearer.

The invention is not limited to the examples described. One example variation may comprise:

Establishing a single RAB/PDP context with a new QoS class indicating per-packet priority handling The RNC sets up 2 or more Radio Bearers (RBs), including RLC machines, for such a RAB, each RB associated with a separate priority level Mapping of Diffserv marked packets in the downlink to bearers is done either by the GGSN mapping DSCP/TOS value to a new per-packet priority value, appended to each GTP-packet sent to the RNC, and used by RNC to select the RB, or by the RNC sniffing at the DSCP/TOS value of downlink packets, and directly selecting the RB;

In the uplink, something similar to the TFT-UL need to be provided from network to terminal, but now as part of establishing the multiple RBs (part of RRC protocol).

Another variation may comprise:

Instead of using the per packet priority marking, the TFT deciding the mapping to the bearer priority level is updated once the application flow is started, such that the IP address and/or port and/or protocol ID of the application flow is included. Thus the newly started application flow will be mapped to one of the pre-established multiple bearers with a specific priority handling in the radio network.

This may be done by a new signal from a policy function to the GGSN for downlink flows, and by a signal from the service network to the terminal for uplink flows.

Some of the advantages of the Invention are:

The implementation is scalable and flexible. It provides a simple solution, e.g. because there is less per-flow state handling, especially when several different service types can share this as a common QoS mechanism;

Premium content can with good planning be delivered with high quality using priority mechanisms, under control of operator;

No latency at service access due to PDP Context establishment/modification signalling;

In line with 3GPP QoS model, i.e. reuse existing QoS classes, and does not redefine the one-to-one relations between PDP context and RAB on the one hand and RAB and RLC entity on the other hand;

Avoids the problems of defining and IOT testing specific RABs for each end-user service (and associated combinations with all other RAB configurations). Only defining the RAB configuration for priority handling is needed, which configuration then is used by several services. Note: If a service by time grows to be a major part of the traffic, a specific Guaranteed Bit Rate RAB could be defined and tested at that point in time.

Once the priority mechanism is implemented by the RAN, the provisioning of a new service is done primarily in the service layer;

At least for WCDMA, the use of priority-based Interactive bearers is particularly suitable for the HS-DSCH on the radio interface, which in itself provides better performance than the DCH;

Well adapted to current Internet approach for QoS and elastic/adaptive applications;

For downlink traffic: can be fully network controlled with only small changes in 3 GPP standards.

What is claimed is:

1. A method for transferring a packet on a bearer in a mobile telecommunication system, wherein the system comprises:

a mobile terminal;

a network with one or more network nodes supporting flow of a packet to the mobile terminal (downlink) and from the mobile terminal (uplink);

said method comprising the steps of:
setting up one or multiple parallel bearers for bearing packets across a radio interface;
associating said multiple parallel bearers with a bearer priority level of traffic handling;
determining a priority level of said packet;
mapping the packet to one of the multiple parallel bearers based on the priority level; and,
using the bearer priority level to prioritise the access to the radio resources;
wherein the step of setting up one or multiple parallel bearers consists in that the network initiates the set up of a bearer with a signal to the mobile terminal; and,
wherein the mapping of a packet in the downlink direction to one of the multiple bearers is controlled by configuring a packet filter for the bearer, containing the IP address and/or port number and/or Protocol Id of the packet, in a Gateway node terminating the bearer.

2. The method recited in claim 1, further comprising the steps of:
setting up said multiple parallel bearers before a session on application level is initiated for bearing the packet across a radio interface; and, if radio resources should be reserved; and,
reserving the radio resources of said network for any of the multiple parallel bearers after said setting up of the bearers.

3. The method recited in claim 1, wherein the packet to be transmitted is an uplink packet, and wherein the step of mapping is characterized in that:
the network determines the bearer to which the uplink packet shall be mapped, based on matching the priority level of the uplink packet with the priority level of the bearer;
the network constructs an uplink packet filter for the determined bearer and signals this to the mobile terminal; and,
once the uplink packet is to be transferred, the mapping is performed within the mobile terminal, based on the uplink packet filter signalled from the network.

4. The method according to claim 3, further characterized in that the uplink packet filter is based on the addressing information of the IP header, or a subset thereof, including: destination IP address and/or the destination IP port number and/or protocol ID.

5. The method according to claim 4, further characterized in that the uplink filter for a bearer in the mobile terminal, is signaled to the mobile terminal when the network is informed about the addressing information of the IP header for the uplink packet or a flow of uplink packets.

6. The method according to claim 5, further characterised in that the network is informed about the addressing information of the IP header by session level signaling between the mobile terminal and server or proxy server in the network.

7. The method according to claim 3, further characterised in that the uplink packet filter is constructed and signaled to the mobile terminal, before the network is informed about the need to transfer the uplink packet, and that the uplink packet filter is based on a DiffServ Code Point value, an IP version 4 Type Of Service value or an IP version 6 Type Of Service value.

8. The method recited in claim 1, wherein the step of determining a priority level of said packet is decided by a policy control function in the network.

9. The method according to claim 8, where the step of determining a priority level further characterized in that the network informs the application on the terminal side about the priority level for a flow of packets consists in including an indication on how to mark the packet priority level for the packets of the flow in an application level signalling message, that is exchanged to establish the flow of packets.

10. The method recited in claim 1, the system further comprising:
a mobile connection between the network and said mobile terminal, the method further comprising the step of:
deciding to switch the channel state of the mobile connection by state transition signalling between the network and the mobile terminal, based on arrival of the packet and packet arrival statistics from the past;
wherein the step of using the bearer priority level to prioritise the access to the radio resources is characterized in that the network reassigns resources from a mobile terminal with only low bearer priority level(s) to a mobile terminal with a high bearer priority level, by switching the mobile connection of the high priority terminal to a channel state permitting a high data rate, and switching the mobile connection of the low priority terminal to a channel state permitting lower data rates.

11. The method recited in claim 1,
wherein the step of associating further comprises associating each of said one or multiple parallel bearers with one or more other bearer characteristics;
the method further comprising the step of using the one or more other bearer characteristics to select radio network parameters to use for transferring the packet, wherein the step of setting up and associating is characterised in that for each bearer, the associated bearer priority level and one or more other bearer characteristics, are indicated by a combined single protocol parameter in signalling between network nodes when setting up the bearer.

12. The method according to claim 11, characterized in that said radio network parameters determining the bearer characteristics include one or more of: use of retransmission protocol, delay threshold parameters for scheduling, packet drop policies in queues and use of header compression.

13. The method according to claim 1, wherein the packet priority level is indicated with an IP Differentiated Services Codepoint, Internet Protocol version 4 Type-Of-Service value or Internet Protocol version 6 Traffic Class value.

14. The method according to claim 1, wherein real-time traffic is mapped to a bearer optimized for low latency.

15. A method for transferring a packet on a bearer in a mobile telecommunication system, wherein the system comprises:
a mobile terminal;
a network with one or more network nodes supporting flow of a packet to the mobile terminal (downlink) and from the mobile terminal (uplink);
said method comprising the steps of:
setting up one or multiple parallel bearers for bearing packets across a radio interface;
associating said multiple parallel bearers with a bearer priority level of traffic handling;
determining a priority level of said packet;
mapping the packet to one of the multiple parallel bearers based on the priority level; and, using the bearer priority level to prioritise the access to the radio resources;
wherein the step of setting up one or multiple parallel bearers consists in that the network initiates the set up of a bearer with a signal to the mobile terminal;
wherein an event triggers the setting up of multiple parallel bearers, the event comprising one of the group including:
the establishment of a first bearer for Internet Protocol connectivity;
a user of the mobile terminal accessing a specific Universal Resource Locator or Internet Protocol address though the mobile terminals triggers said setting up of multiple parallel bearers; and,
a signalling message on application level, such as a Session Initiation Protocol message.

16. The method, according to claim 1, wherein the decision to set up the multiple bearers is based on a parameter of the group including:
a general subscription level of the user, such as Gold, Silver or Bronze, which level determines whether the user is authorised to activate certain services;
a service, such as a premium or non-premium service, to which the user is subscribed;
a likelihood of the user to activate specific premium services requiring the prioritisation function.

17. A method for transferring a packet on a bearer in a mobile telecommunication system, wherein the system comprises:
a mobile terminal;
a network with one or more network nodes supporting flow of a packet to the mobile terminal (downlink) and from the mobile terminal (uplink);
said method comprising the steps of:
setting up one or multiple parallel bearers for bearing packets across a radio interface;
associating said multiple parallel bearers with a bearer priority level of traffic handling;
determining a priority level of said packet;
mapping the packet to one of the multiple parallel bearers based on the priority level; and,
using the bearer priority level to prioritise the access to the radio resources;
wherein the step of setting up one or multiple parallel bearers consists in that the network initiates the set up of a bearer with a signal to the mobile terminal;
wherein the step of determining a packet priority level is based on a parameter selected from the group comprising:
a type of application flow;
a service level;
a charging level;
a Universal Resource Locator of an application server;
an Internet Protocol address of an application server;
a general subscription level of the subscriber; and,
whether the subscriber is authorised to activate the service.

18. The method according to claim 1, wherein a flow identification function controls and/or marks the packet priority level in the downlink, before the packet reaches a Gateway General Packet Radio Service Node.

19. The method according to claim 1, wherein, for flows in the downlink direction, the operator controls the application server, to set the per-packet priority indication differently for different application flows.

20. The method according to claim 1, wherein the terminal is informed about the marking of the packet priority level for an uplink flow before the start of the flow by means of a signalling method on application level, such as a Session Initiation Protocol message.

21. The method, according to claim 1, wherein the packet priority level is included as a Diffserv Code Point, Internet Protocol version 4 Type Of Service value, or Internet Protocol version 6 Traffic Class value together with the Internet Protocol address and port number of each packet flow described in a Session Initiation Protocol message.

22. The method according to claim 1, wherein, in the uplink, a function in the mobile terminal marks the packet with a priority level according to a policy stored in the mobile terminal, the function comprising an application running on the mobile terminal or a common priority-marking function within the mobile terminal.

23. The method according to claim 22, wherein the network configures or reconfigures the policy stored in the mobile terminal by use of signalling procedures.

24. The method according to claim 1, wherein the multiple parallel bearers are realized as multiple parallel Packet Data Protocol contexts between the terminal and a Gateway General Packet Radio Service Node, each associated with an individual traffic handling priority.

25. The method, according to claim 24, wherein one of the Packet Data Protocol contexts is a primary context and the one or more additional bearers are secondary Packet Data Protocol contexts.

26. The method, according to claim 25, wherein the primary Packet Data Protocol context is assigned the lowest traffic handling priority level.

27. The method, according to claim 25, wherein a policy control of the network enforces the lowest traffic handling priority level for the primary Packet Data Protocol context during the establishment procedure of this primary Packet Data Protocol context.

28. The method, according to claim 25, wherein the network sends an order to the terminal to establish one or more secondary Packet Data Protocol contexts in addition to a primary Packet Data Protocol context, at the event triggering the setting up of the multiple parallel bearers.

29. The method, according to claim 28, wherein said order comprises information of a group including:
quality of service level such as type and traffic handling priority level; and,
mapping of the packets onto the Packet Data Protocol contexts as a traffic flow template, which template is included by the terminal in the signalling when establishing the additional secondary Packet Data Protocol contexts.

30. The method, according to claim 28, wherein the order from the network to the terminal is sent as a new Wireless Application Protocol Push message.

31. The method, according to claim 28, wherein the order from the network to the terminal is sent as a new 3GPP Session Management message.

32. The method, according to claim 28, wherein the network, by broadcast information, orders the terminal to always set up one or more secondary Packet Data Protocol contexts in conjunction with establishing a primary Packet Data Protocol context, in the network.

33. The method according to claim 1, wherein the Gateway General Packet Radio Service Node implements the mapping of the packet to one of the multiple parallel bearers in the downlink.

34. The method according to claim 1, wherein rules for the mapping are defined as traffic flow templates, for which the DiffServ Code Point or Type-of-Service field of the IP packets are used.

35. The method according to claim 1, wherein the mapping of the packet to one of the bearers in the uplink is implemented in the terminal.

36. The method according to claim 1, wherein the step of using the bearer priority level to prioritise access to the radio resources is done by the one or more network nodes, with mechanisms depending on the channel type the terminal is using, and ensuring prioritisation between bearers of one user and between bearers of different users in the system.

37. The method according to claim 1, wherein the step of prioritising access is implemented by a scheduling algorithm, that can operate with strict priority, by always scheduling any packet with high priority level before all low priority packets, or operate with different level of fairness by ensuring some minimum level of throughput for lower priority traffic, and that combines the priority level with a variable number of other parameters, such as channel condition, delay threshold or buffer fill level.

38. The method according to claim 1, wherein the network, when deciding on dedicated resource assignment to a bearer, uses the priority level as input to the assignment decision, such that a bearer with high priority has a higher probability of being assigned a dedicated resource and/or a higher probability of being assigned a dedicated resource of a large size.

39. The method according claim 38, wherein the network applies a preemption mechanism, whereby a packet arriving on a high priority bearer can trigger the release of dedicated resources for a lower priority bearer, of the same or another terminal, in order for the network to assign these resources to the high priority bearer.

40. The method according to claim 1, wherein the network, when using a shared resource assignment to a bearer, uses the bearer priority level as input to the scheduling decision, in such a manner that a packet on a bearer with a high priority level has a higher probability of being scheduled to the shared resource and/or a higher probability of being allocated a large portion of the shared resource.

41. The method according claim 40, wherein the shared resource comprises at least one type of channel of the group including:
- a "3GPP WCDMA HS-DSCH" channel, or "HSDPA";
- a "3GPP WCDMA Enhanced DCH channel", or "Enhanced Uplink", or "HSUPA";
- a "3GPP GERAN PDCH channel".

42. The method according to claim 40, wherein for uplink traffic said scheduling is signalled from the one or more network nodes as a limitation on the maximum allowed rate either per individual terminal, based on individual terminals priority levels known by the one or more network nodes, or per traffic priority level, common for all terminals.

43. The method according to claim 1, wherein the network optimises a bearer for low latency using a method out of a group including:
- using unacknowledged mode in radio link control protocol;
- using a queuing time as a parameter for scheduling transmission of a packet to limit a delay;
- using a lower target for a block error rate;
- using robust header compression on an Internet Protocol packet transmitted on said bearer.

44. The method, according to claim 1, wherein the multiple parallel bearers are radio bearers between the terminal and an Radio Network Controller, each radio bearer being related to a common radio access bearer and a common Packet Data Protocol context, and each radio bearer being associated with a retransmission radio link controller protocol entity.

45. The method, according to claim 44, wherein the common bearer includes an attribute indicating the use of priority handling within the common bearer, which triggers the Radio Access Network to set up multiple parallel radio bearers for the common radio access bearer.

46. The method, according to claim 1, wherein the Radio Access Network uses a priority level of the packet, included in the tunnelling of data from the Core Network to the Radio Access Network to select a radio bearer for the packet

* * * * *

UNITED STATES PATENT AND TRADEMARK OFFICE
CERTIFICATE OF CORRECTION

PATENT NO. : 8,300,575 B2
APPLICATION NO. : 11/722426
DATED : October 30, 2012
INVENTOR(S) : Willars It is certified that error appears in the above-identified patent and that said Letters Patent is hereby corrected as shown below:

In Column 19, Line 14, in Claim 15, delete "though" and insert -- through --, therefor.

In Column 19, Line 18, in Claim 16, delete "method," and insert -- method --, therefor.

In Column 20, Line 6, in Claim 21, delete "method," and insert -- method --, therefor.

In Column 20, Line 27, in Claim 25, delete "method," and insert -- method --, therefor.

In Column 20, Line 31, in Claim 26, delete "method," and insert -- method --, therefor.

In Column 20, Line 34, in Claim 27, delete "method," and insert -- method --, therefor.

In Column 20, Line 39, in Claim 28, delete "method," and insert -- method --, therefor.

In Column 20, Line 44, in Claim 29, delete "method," and insert -- method --, therefor.

In Column 20, Line 53, in Claim 30, delete "method," and insert -- method --, therefor.

In Column 20, Line 56, in Claim 31, delete "method," and insert -- method --, therefor.

In Column 20, Line 59, in Claim 32, delete "method," and insert -- method --, therefor.

In Column 21, Line 29, in Claim 39, delete "according claim" and insert -- according to claim --, therefor.

In Column 22, Line 1, in Claim 41, delete "according claim" and insert -- according to claim --, therefor.

In Column 22, Line 24, in Claim 44, delete "method," and insert -- method --, therefor.

Signed and Sealed this
Fifth Day of March, 2013

Teresa Stanek Rea
*Acting Director of the United States Patent and Trademark Office*

CERTIFICATE OF CORRECTION (continued)
U.S. Pat. No. 8,300,575 B2

In Column 22, Line 30, in Claim 45, delete "method," and insert -- method --, therefor.

In Column 22, Line 35, in Claim 46, delete "method," and insert -- method --, therefor.

In Column 22, Line 38, in Claim 46, delete "packet" and insert -- packet. --, therefor.